US012623671B2

(12) United States Patent
Sen

(10) Patent No.: US 12,623,671 B2
(45) Date of Patent: May 12, 2026

(54) TRAILER ANGLE ESTIMATION USING MACHINE LEARNING

(71) Applicant: NVIDIA Corporation, Santa Clara, CA (US)

(72) Inventor: Ayon Sen, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 244 days.

(21) Appl. No.: 18/363,477

(22) Filed: Aug. 1, 2023

(65) Prior Publication Data

US 2025/0042416 A1     Feb. 6, 2025

(51) Int. Cl.
| | |
|---|---|
| *B60W 50/00* | (2006.01) |
| *B60D 1/06* | (2006.01) |
| *B60D 1/24* | (2006.01) |
| *B62D 15/02* | (2006.01) |
| *G06T 7/20* | (2017.01) |
| *G06T 17/00* | (2006.01) |

(Continued)

(52) U.S. Cl.
CPC ........... *B60W 50/0097* (2013.01); *B60D 1/06* (2013.01); *B60D 1/24* (2013.01); *G06T 7/20* (2013.01); *G06T 17/00* (2013.01); *G06V 10/764* (2022.01); *G06V 10/82* (2022.01); *G06V 20/56* (2022.01); *B62D 15/027* (2013.01)

(58) Field of Classification Search
CPC ....... B60W 50/0097; B60D 1/06; B60D 1/24; G06T 7/20; G06T 17/00; G06V 10/764; G06V 10/82; G06V 20/56; B62D 15/027
See application file for complete search history.

(56) References Cited

U.S. PATENT DOCUMENTS

| | | | | |
|---|---|---|---|---|
| 9,798,953 | B2 * | 10/2017 | Hu | .......................... G06V 20/56 |
| 10,532,698 | B2 * | 1/2020 | Potnis | ..................... B60R 1/003 |

(Continued)

FOREIGN PATENT DOCUMENTS

| | | | | | |
|---|---|---|---|---|---|
| CN | 115195604 | A | * | 10/2022 | ............... B60R 1/00 |
| DE | 102017107542 | A1 | * | 10/2017 | ............... G06T 7/62 |
| DE | 102016117284 | A1 | * | 3/2018 | ............... B60D 1/62 |

OTHER PUBLICATIONS

Translation of DE-102017107542-A1, 8 pages (Year: 2017).*

(Continued)

*Primary Examiner* — Dale W Hilgendorf
(74) *Attorney, Agent, or Firm* — Freestone Intellectual Property Law PLLC

(57) ABSTRACT

In various examples, a trailer angle may be estimated using one or more machine learning models to predict one or more keypoints on the center axis of the trailer drawbar (e.g., a keypoint representing the drawbar junction around which the drawbar pivots, one or more other keypoints along the center axis), back-projecting the predicted keypoint(s) onto a three-dimensional (3D) representation of the ground, and calculating the angle between the longitudinal axis of the towing vehicle and a line or ray formed by or fitted to the projected keypoints. The trailer angle may be estimated at any frame rate. For each frame, keypoints may be predicted from that frame and/or optical flow or some other type of feature tracking may be used to propagate predicted keypoint(s) from a preceding frame in lieu of predicting keypoint(s), and the resulting keypoint(s) may be used to estimate the trailer angle for that frame.

20 Claims, 17 Drawing Sheets

(51) Int. Cl.

| | |
|---|---|
| *G06V 10/764* | (2022.01) |
| *G06V 10/82* | (2022.01) |
| *G06V 20/56* | (2022.01) |

(56) References Cited

U.S. PATENT DOCUMENTS

| | | | | |
|---|---|---|---|---|
| 10,885,698 | B2 | 1/2021 | Muthler et al. | |
| 11,099,560 | B2 * | 8/2021 | Smith | B65G 69/005 |
| 11,358,637 | B2 * | 6/2022 | Kroeze | G05D 1/0212 |
| 2006/0016954 | A1 * | 1/2006 | Saxwold | B60R 1/003 |
| | | | | 248/467 |
| 2011/0216199 | A1 * | 9/2011 | Trevino | H04N 7/183 |
| | | | | 348/148 |
| 2014/0085472 | A1 * | 3/2014 | Lu | B60R 1/26 |
| | | | | 348/148 |
| 2014/0343795 | A1 * | 11/2014 | Lavoie | B60W 30/18036 |
| | | | | 701/42 |
| 2017/0174128 | A1 * | 6/2017 | Hu | G06T 7/60 |
| 2017/0177973 | A1 * | 6/2017 | Hu | G06T 7/13 |
| 2017/0297619 | A1 * | 10/2017 | Lavoie | B62D 15/024 |
| 2018/0043933 | A1 * | 2/2018 | Hu | B62D 13/06 |
| 2018/0365509 | A1 * | 12/2018 | Naserian | G06V 20/56 |
| 2019/0016264 | A1 * | 1/2019 | Potnis | B60R 1/003 |
| 2019/0118859 | A1 * | 4/2019 | Ghannam | B62D 6/005 |
| 2019/0129429 | A1 * | 5/2019 | Juelsgaard | G01S 17/00 |
| 2019/0217831 | A1 * | 7/2019 | Viele | B60D 1/245 |
| 2019/0302764 | A1 * | 10/2019 | Smith | B65G 69/005 |
| 2019/0347825 | A1 * | 11/2019 | Gupta | B60D 1/245 |
| 2020/0001920 | A1 * | 1/2020 | Hejase | B60W 30/18036 |
| 2020/0051318 | A1 * | 2/2020 | Muthler | G06N 3/084 |
| 2020/0164803 | A1 * | 5/2020 | Jales Costa | B62D 15/0285 |
| 2020/0215992 | A1 * | 7/2020 | Plowman | B60D 1/36 |
| 2020/0282910 | A1 * | 9/2020 | Nagasamy | B60D 1/245 |
| 2021/0027490 | A1 * | 1/2021 | Taiana | B60D 1/245 |
| 2021/0034903 | A1 * | 2/2021 | Daga | G06V 10/7747 |
| 2021/0129906 | A1 * | 5/2021 | Oh | B62D 15/025 |
| 2021/0179172 | A1 * | 6/2021 | Kroeze | G05D 1/0246 |
| 2022/0084212 | A1 * | 3/2022 | Dahal | G06N 3/045 |

| | | | | |
|---|---|---|---|---|
| 2023/0119562 | A1 * | 4/2023 | Diessner | B60W 40/06 |
| | | | | 701/93 |
| 2023/0125045 | A1 * | 4/2023 | Ma | G06T 7/70 |
| | | | | 348/148 |
| 2023/0215183 | A1 * | 7/2023 | Bahramgiri | G06V 10/82 |
| | | | | 382/104 |
| 2023/0227104 | A1 * | 7/2023 | Pandey | B60W 40/105 |
| | | | | 701/17 |
| 2023/0319218 | A1 * | 10/2023 | Ren | G06V 20/56 |
| | | | | 382/284 |
| 2024/0281993 | A1 * | 8/2024 | Rafiei | G06T 7/73 |
| 2025/0128553 | A1 * | 4/2025 | Shen | B60D 1/36 |

OTHER PUBLICATIONS

Translation of CN-115195604-A, 9 pages (Year: 2022).*

Translation of DE-102016117284-A, 8 pages (Year: 2016).*

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

100

SENSOR(S)
101

SENSOR
DATA
102

TRAILER ANGLE ESTIMATOR
110

MACHINE-LEARNING
MODEL(S) 112

BACK-PROJECTION
COMPONENT 114

ANGLE COMPUTATION
COMPONENT 116

PREDICTION
PROPAGATION
COMPONENT 118

DRIVE STACK 122

ACTUATION
COMPONENT(S)
134

OBSTACLE
AVOIDANCE
COMPONENT(S)
132

CONTROL
COMPONENT(S)
130

PLANNING
COMPONENT(S)
128

WORLD MODEL
MANAGER
126

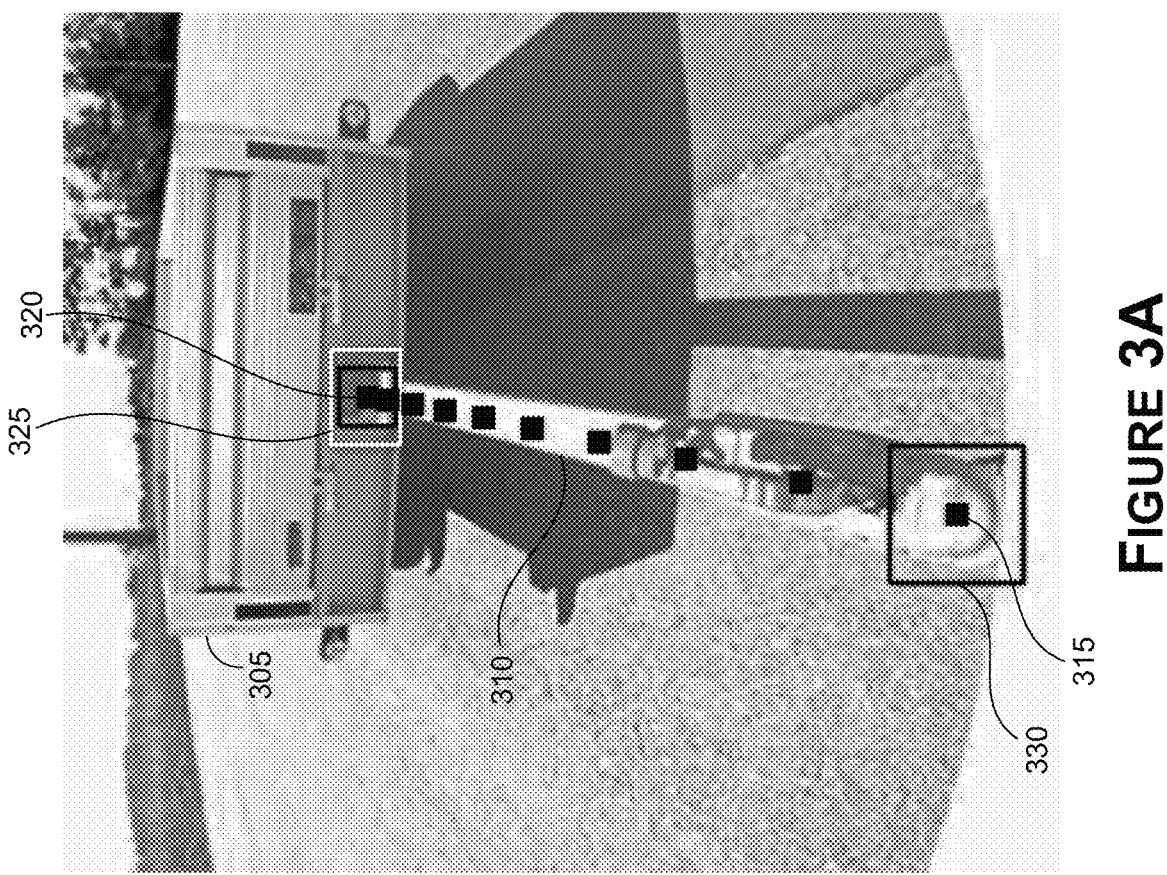
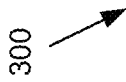
FIGURE 3A

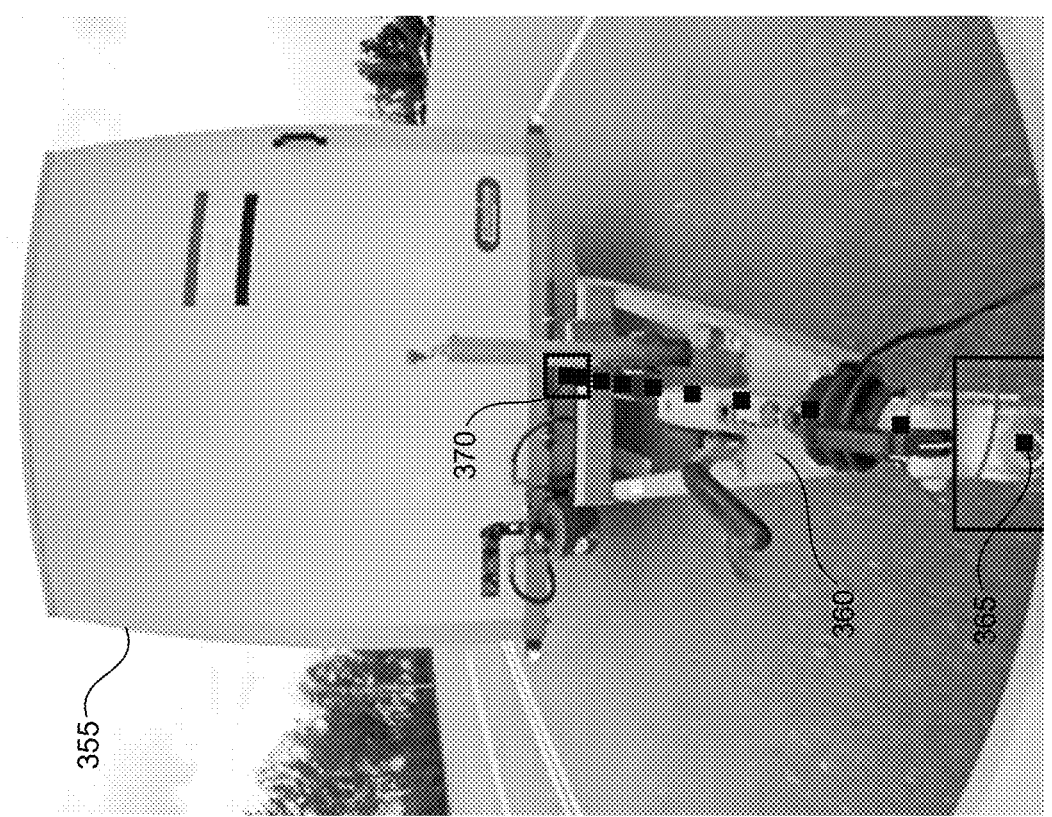
350
FIGURE 3B

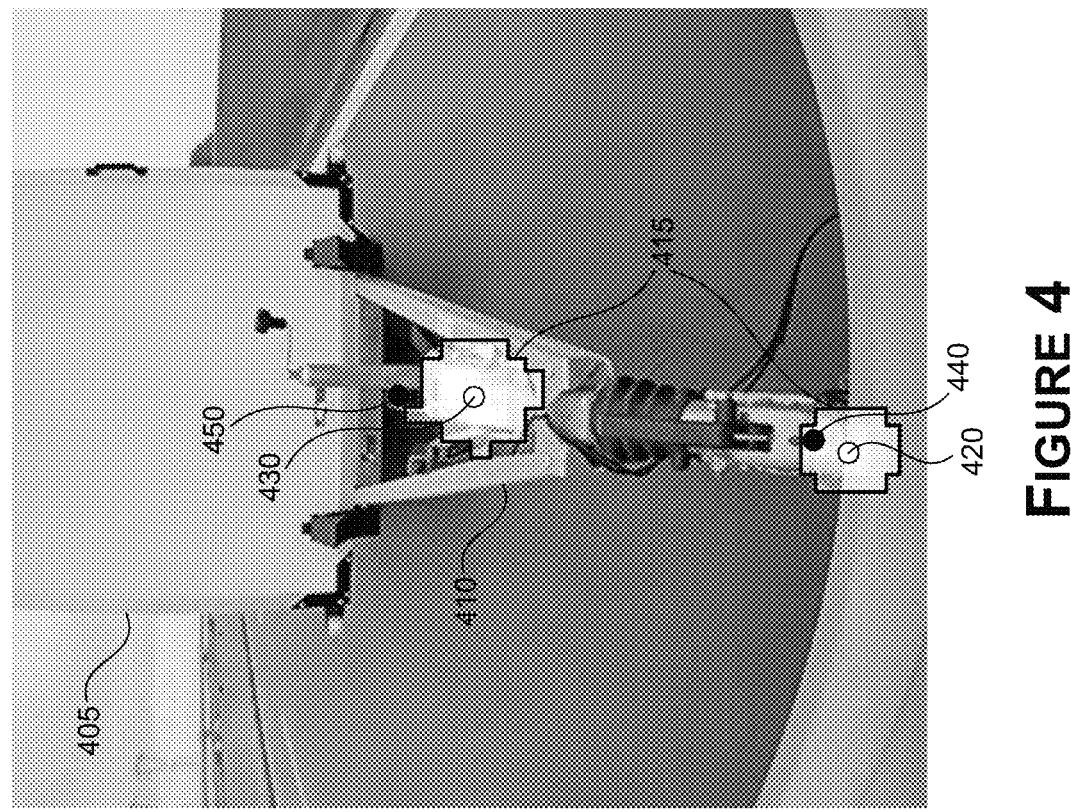
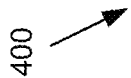
FIGURE 4

500

TRAILER DATA GENERATION SYSTEM
500

ANNOTATION INTERFACE
COMPONENT 510

BACK-PROJECTION COMPONENT
520

CENTER AXIS ESTIMATION
COMPONENT 530

PROJECTION COMPONENT
540

CENTER AXIS ESTIMATION
COMPONENT 550

PROJECTION COMPONENT
560

800

GENERATE, BASED AT LEAST ON APPLYING TO ONE OR MORE MACHINE LEARNING MODELS A REPRESENTATION OF SENSOR DATA REPRESENTING A VIEW OF A DRAWBAR CONNECTING A TRAILER TO AN EGO-MACHINE, A REPRESENTATION OF TWO OR MORE POINTS ASSOCIATED WITH A CENTER AXIS OF THE DRAWBAR
B802

GENERATE, BASED AT LEAST ON THE TWO OR MORE POINTS, AN ESTIMATED TRAILER ANGLE BETWEEN A FIRST AXIS OF THE EGO-MACHINE AND A SECOND AXIS OF THE TRAILER
B804

CONTROL ONE OR MORE OPERATIONS OF THE EGO-MACHINE BASED AT LEAST ON THE ESTIMATED TRAILER ANGLE
B806

RECEIVE A REPRESENTATION OF LABELED 2D
KEYPOINT LOCATIONS IN IMAGE DATA OF ONE
OR MORE PAIRS OF KEYPOINTS THAT ARE
SYMMETRICAL ABOUT A CENTER AXIS OF A
DRAWBAR CONNECTING A TRAILER TO AN
EGO-MACHINE
B902

GENERATE A REPRESENTATION OF A 3D
ESTIMATE OF A PROJECTION OF THE CENTER
AXIS OF THE DRAWBAR BASED AT LEAST ON
THE LABELED 2D LOCATIONS
B904

PROJECT ONE OR MORE 3D POINTS
ASSOCIATED WITH THE 3D ESTIMATE OF THE
PROJECTION OF THE CENTER AXIS OF THE
DRAWBAR TO ONE OR MORE CORRESPONDING
2D POINTS IN THE IMAGE SPACE
B906

GENERATE GROUND TRUTH TRAINING DATA
BASED AT LEAST ON THE ONE OR MORE
CORRESPONDING 2D POINTS
B908

1200
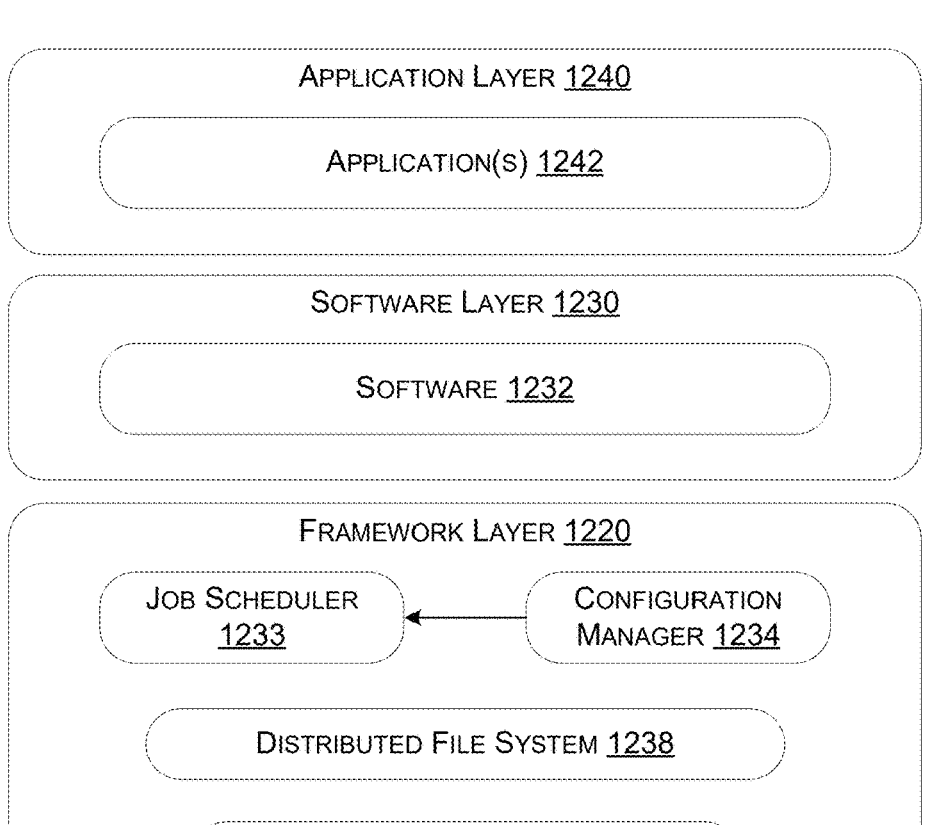
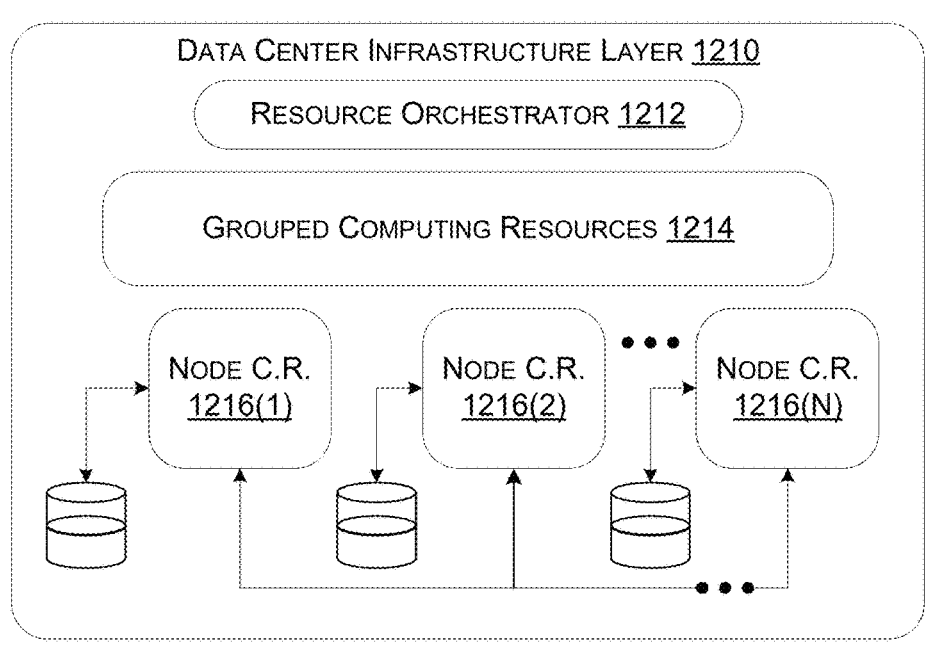
FIGURE 12

TRAILER ANGLE ESTIMATION USING MACHINE LEARNING

BACKGROUND

A vehicle trailer, commonly known as a trailer, may be coupled to a powered vehicle such as a car, truck, or sport utility vehicle via a draw bar and towed. Trailers may be used for various purposes, such as transporting goods, carrying recreational vehicles such as boats or motorcycles, hauling construction equipment, or moving personal belongings. Knowing the angle a trailer makes with the towing vehicle is crucial for safe and efficient towing. This angle is known as the "trailer angle" or "trailer kink angle" and typically refers to the angular difference between the longitudinal axis of the towing vehicle and the longitudinal axis of the trailer (or the angle between the directions the towing vehicle and the trailer are pointing).

The trailer angle is an important input to vehicle control algorithms for several reasons. For example, the trailer angle can impact the stability of the towing setup. If the trailer angle becomes too large, it can lead to instability, sway, or even jackknifing. As such, some vehicle control algorithms seek to maintain an appropriate trailer angle to ensure stability during acceleration, deceleration, turns, lane changes, reversing, and other maneuvers. Accordingly, knowledge of the trailer angle enables vehicle control algorithms to provide for better control and smoother handling and prevent potential accidents or damage to the trailer and other vehicles. The trailer angle also impacts the clearance required to safely navigate corners and obstacles, so knowledge of the trailer angle allows vehicle control algorithms to determine whether there is enough clearance to make a turn without hitting curbs, vehicles, and/or other objects on the road. The trailer angle is particularly important when a towing vehicle is in reverse. By understanding the trailer angle, vehicle control algorithms can predict the trailer's path, assist the driver in manipulating the trailer direction while reversing, and/or adjust steering controls accordingly, making it easier to back up or park the trailer accurately.

Conventional techniques for estimating the trailer angle have a variety of draw backs. For example, a typical vehicle configuration may include a single rear-facing camera (e.g., a fisheye camera) that views an attached trailer. Classical approaches to trailer angle estimation typically attempt to identify trailer or trailer draw bar features that are visible in a particular frame (e.g., an image generated using the rear-facing camera) and track those features from frame to frame. Another class of algorithms extracts edges in the frame, determines which edges are part of the draw bar, and uses those edges to fit a line and calculate the angle between that line and the vehicle. These conventional techniques rely on classical feature extraction, which evaluates neighboring pixels to identify regions of high contrast from frame to frame. However, since these conventional techniques rely on contrast, they are highly susceptible to lighting or environmental changes, which occur frequently and can result in inaccurate and even failed trailer angle estimates. In one example, driving under or past something like a tree or a building that casts a shadow on the object being tracked will typically result in a much darker scene in which relative contrast is no longer detectable. As a result, object tracking—and therefore, trailer angle estimation-often fails to produce a valid estimate in situations like these. Furthermore, conventional techniques may not be as suitable for real-time deployment as the computational resources required to distinguish which tracked keypoints or extracted edges are part of the trailer or the trailer draw bar may increase latency of the system. As such, there is a need for improved techniques for estimating trailer angle.

SUMMARY

Embodiments of the present disclosure relate to trailer angle estimation using machine learning. More specifically, systems and methods are disclosed that estimate the trailer angle based on an image of a trailer being towed by a towing vehicle.

In contrast to conventional systems, such as those described above, a trailer angle may be estimated using one or more machine learning models to predict one or more keypoints on the center axis of the trailer draw bar (e.g., a keypoint representing the draw bar junction around which the draw bar pivots, one or more other keypoints along the center axis), back-projecting the predicted keypoint(s) onto a three-dimensional (3D) representation of the ground, and calculating the angle between the longitudinal axis of the towing vehicle and a line or ray formed by or fitted to the projected keypoints. The trailer angle may be estimated at any frame rate. For each frame, keypoints may be predicted from that frame and/or optical flow or some other type of feature tracking may be used to propagate predicted keypoint(s) from a preceding frame in lieu of predicting keypoint(s), and the resulting keypoint(s) may be used to estimate the trailer angle for that frame.

In some embodiments, training data may be generated from one or more videos of a corresponding trailer being towed and used to train one or more machine learning models to predict one or more keypoints along a center axis of a trailer draw bar. In some embodiments and/or for some draw bar designs (e.g., an I-frame draw bar), ground truth keypoint locations may be directly annotated (e.g., by a human labeler) on any given frame. In some embodiments and/or for some draw bar designs (e.g., a V-frame or Y-frame draw bar), one or more pairs of keypoints (e.g., on the draw bar) that are symmetrical about the center axis (e.g., the two tips of the wide end of a V-frame or Y-frame draw bar) may be labeled, back-projected into 3D space (e.g., a rig coordinate system of the vehicle), and used to calculate the location of (e.g., a line or ray fitted to) a corresponding projection of the center axis of the draw bar. One or more 3D points sampled along the 3D estimate of the projected center axis of the draw bar (e.g., one or more endpoints of the projected center axis, equally spaced 3D points, etc.) may be projected back into image space and used as corresponding labeled keypoint location(s). As such, the labeled keypoint locations may be used to generate corresponding ground truth data corresponding to the design of the machine learning model(s). In some embodiments, one or more labeled keypoints may be propagated from frame to frame using optical flow or some other type of feature tracking to reduce the amount of (e.g., manual) annotations needed. In some embodiments, training data representing examples of different trailer angles, different lighting conditions, different draw bar designs, and/or other characteristics may be generated. As such, the machine learning model(s) may be trained to recognize trailer angle in various lighting conditions, independent of draw bar design.

BRIEF DESCRIPTION OF THE DRAWINGS

The present systems and methods for trailer angle estimation using machine learning are described in detail below with reference to the attached drawing figures, wherein:

FIGS. 3A-3B illustrate example keypoint locations for different types of trailer draw bars, in accordance with some embodiments of the present disclosure:

FIG. 4 is an illustration of example classification data representing a predicted likelihood that each pixel is part of a detected keypoint, in accordance with some embodiments of the present disclosure:

FIG. 8 is a flow diagram showing a method for estimating a trailer angle, in accordance with some embodiments of the present disclosure:

FIG. 9 is a flow diagram showing a method for generating ground truth training data based on one or more pairs of keypoints that are symmetrical about a center axis of a trailer draw bar, in accordance with some embodiments of the present disclosure:

FIG. 12 is a block diagram of an example data center suitable for use in implementing some embodiments of the present disclosure.

DETAILED DESCRIPTION

Figure 1:
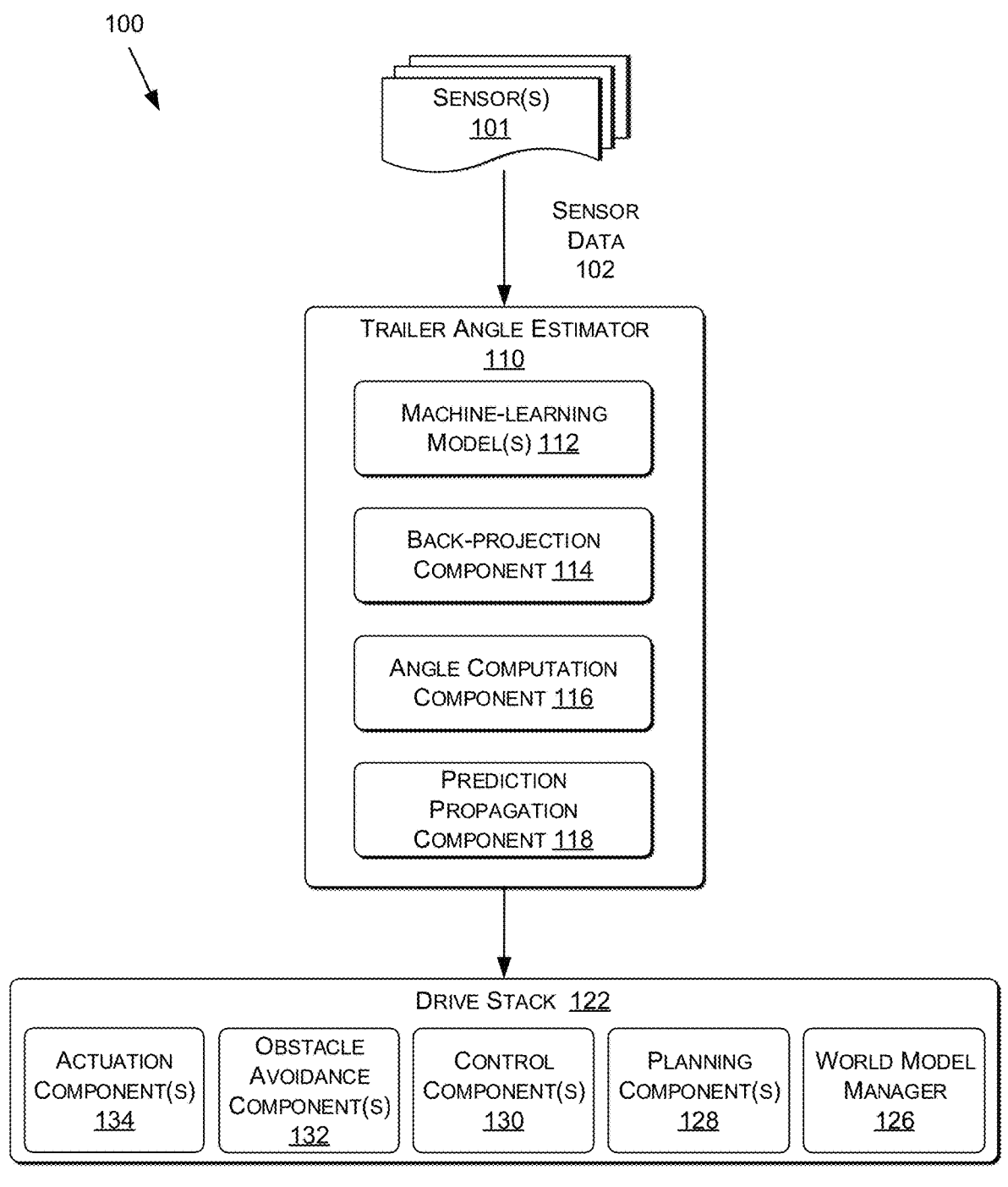
FIG. 1 is a data flow diagram illustrating an example trailer angle estimation pipeline, in accordance with some embodiments of the present disclosure.

Systems and methods are disclosed related to trailer angle estimation using machine learning. For example, systems and methods are disclosed that predict a trailer angle from an image of a trailer being towed by a towing vehicle by predicting one or more keypoints on the center axis of the trailer draw bar (e.g., a keypoint representing the draw bar junction around which the draw bar pivots, one or more other keypoints along the center axis), back-projecting the predicted keypoint(s) onto a three-dimensional (3D) representation of the ground, and calculating the angle between the longitudinal axis of the towing vehicle and a line or ray formed by or fitted to the projected keypoints. Furthermore, systems and methods are disclosed that train one or more machine learning models to predict the trailer angle from an image of a trailer being towed using training data generated by back-projecting annotated keypoints symmetric about the center axis of a trailer draw bar onto a 3D representation of the ground, using the projected annotated keypoints to estimate the projected center axis of the draw bar, re-projecting one or more points on the estimated projected center axis back into image space, and/or propagating ground truth keypoints from frame to frame to minimize labeling demands. The present techniques may be used by autonomous vehicles, semi-autonomous vehicles, robots, and/or other object or machine types to estimate the trailer angle, and the estimated trailer angle may be provided to an autonomous vehicle drive stack or other control algorithm to enable safe and comfortable planning and control of the vehicle, robot, or other object.

Although the present disclosure may be described with respect to an example autonomous or semi-autonomous vehicle or machine 1000 (alternatively referred to herein as "vehicle 1000" or "ego-machine 1000," an example of which is described with respect to FIGS. 10A-10D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft remotely operated vehicles such as drones, and/or other vehicle types. In addition, although the present disclosure may be described with respect to trailer angle estimation for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where trailer angle estimation may be used.

There are a few different types of trailer draw bars, also known as trailer tongues or hitches. A straight draw bar (also called an I-frame draw bar based on its I-shaped structure) is a straight, rigid bar that extends from the front of the trailer and connects to the tow hitch on the towing vehicle. The V-frame (or A-frame) draw bar gets its name from its triangular V-shaped (or A-shaped) structure. The wide end of the frame attaches to the trailer, while the narrow end connects to the tow hitch. The Y-frame drawbar gets its name from its Y-shaped structure, where the wide end attaches to the trailer like the V-frame, and the straight end attaches to the tow hitch. Some draw bars pivot at the point of attachment with the towing vehicle, while others pivot at a junction in the draw bar. Regardless of the draw bar design, the draw bar typically attaches to a particular point (e.g., the tow hitch) on the towing vehicle and to one or more points on the trailer.

At a high level, one or more sensors (e.g., a rear-facing camera) of a vehicle may be used to generate sensor data (e.g., an image) of a trailer attached to the vehicle, and one or more machine learning models (e.g., a neural network) may be used to predict one or more keypoints in the image representing point(s) on the center axis of the trailer draw-bar. Note that depending on the draw bar design and/or the embodiment, the predicted keypoint(s) need not land on the draw bar itself. By predicting keypoint(s) that are (e.g., substantially) on the center axis of the drawbar (e.g., the line of symmetry of a V-frame or Y-frame draw bar), the machine learning model(s) may learn to predict relevant keypoint(s) independent of the draw bar design. In some embodiments, since the pivot point (e.g., the tow hitch) is typically in a fixed location on the center axis of the draw bar in image space, that known location may (but need not) be used as a fixed keypoint. As such, the keypoints in a particular image may be back-projected into three-dimensional (3D) space (e.g., onto the ground plane), a line or ray may be fitted to the resulting 3D points, and the angle between the fitted line or ray and the longitudinal axis of the vehicle may be taken as the trailer angle.

In some embodiments, training data for the one or more machine learning models may be generated from one or more videos of a corresponding trailer being towed. In some embodiments and/or for some draw bar designs (e.g., where one or more desired keypoints along the center axis of the draw bar land on edges of the draw bar, junctions between the draw bar and the vehicle or trailer, or other visually intuitive locations), ground truth keypoint locations may be directly annotated (e.g., by a human labeler). For example, an I-frame draw bar typically has a fixed connection to the vehicle (e.g., at the draw bar junction), so that point may be labeled directly on a particular frame and held constant for multiple frames (e.g., the entire video). Furthermore, the opposite end of the I-frame draw bar where the draw bar attaches to the trailer may be labeled directly on a particular frame.

In some embodiments and/or for some draw bar designs (e.g., where one or more desired keypoints along the center axis of the draw bar do not land on the draw bar itself), one or more pairs of keypoints (e.g., on the draw bar) that are symmetrical about the center axis (e.g., the two tips of the wide end of a V-frame or Y-frame draw bar) may be labeled, back-projected into 3D space (e.g., a rig coordinate system of the vehicle), and used to calculate the location of (e.g., a line or ray fitted to) a corresponding projection of the center axis of the draw bar. For example, taking a fixed draw bar junction O and two labeled points in image space A and B which are symmetrical about the center axis of the draw bar, the points A, B, and O may be back-projected from image space onto a 3D representation of the ground (e.g., the ground plane) to generate 3D projected points A', B', and O'. In some embodiments, the angle halfway between the angle <A'O'B' may be identified, and a ray or line projected along that identified angle may be taken as a 3D estimate of the projected center axis of the draw bar. In some embodiments, the midpoint M' of the isosceles triangle formed by O' and the two direction vectors O'A' and O'B' may be identified, and a ray projected from O' to M' (or a line fitted to O' and M') may be taken as a 3D estimate of the projected center axis of the draw bar. In some embodiments, a ray projected from O' to the midpoint X' of A'B' (or a line fitted to O' and X') may be taken as a 3D estimate of the projected center axis of the draw bar. As such, one or more 3D points sampled along the 3D estimate of the projected center axis of the draw bar (e.g., one or more endpoints of the projected center axis, the midpoint M' of the isosceles triangle formed by O' and the two direction vectors O'A' and O'B', equally spaced 3D points, etc.) may be projected back into image space and used as corresponding labeled keypoint location(s).

As such, the labeled keypoint locations may be used to generate corresponding ground truth data corresponding to the design of the machine learning model to be trained. For example, for a neural network where each channel predicts classification data (e.g., a heat map) representing likelihood that each pixel depicts a corresponding keypoint, a ground truth heat map may be generated (e.g., using one value such as one to indicate pixels on a labeled location or inside a labeled region and another value such as zero to indicate pixels outside a labeled location, by positioning and/or centering a 2D distribution such as a Gaussian distribution on a corresponding labeled location, etc.). For a neural network that regresses keypoint coordinates (e.g., two channels regressing corresponding (x,y) coordinates for each keypoint), representative ground truth coordinates of each labeled keypoint (e.g., a labeled point, a center and/or corner point of a labeled bounding box or other annotated shape) may be assigned to a corresponding channel for each coordinate and each keypoint. As such, the generated ground truth data may be associated with a corresponding training input (e.g., image).

In some embodiments, one or more labeled keypoints may be propagated from frame to frame using optical flow or some other type of feature tracking (e.g., Kanade-Lucas-Tomasi (KLT) feature tracking, Scale Invariant Feature Transform (SIFT), Speeded Up Robust Features (SURF), Oriented FAST and Rotated BRIEF (ORB) tracking, etc.) to reduce the amount of (e.g., manual) annotations needed. For example, given a labeled frame, optical flow may be used to propagate the labels from frame to frame, for example, until optical propagation fails (which should be rare, such as on the order of several times over thousands of frames). In some embodiments, when optical propagation fails on a particular frame, a human annotator may be prompted to manually annotate the missing label(s) for that frame, and the process may be repeated. As such, ground truth keypoints may be generated rapidly (e.g., labels for 16,000 frames may be generated in less than a minute), dramatically reducing the need for manual annotations and reducing the time it takes to generate a training dataset. At inference time, one or more predicted keypoints may be propagated from frame to frame using optical flow or some other type of feature tracking, and/or keypoint predictions may be made at some designated rate (e.g., 1, 10, 30 frames per second).

The present techniques allow for a number of technical advantages over prior techniques. For example, using a machine learning model to predict key point locations on or otherwise associated with a center axis of a trailer draw bar results in predictions that are independent of draw bar design, which simplifies the trailer angle estimation process by decoupling the estimation from the draw bar design and eliminates conventional computations that sought to understand object-level semantics (e.g., detecting a draw bar, draw bar design, trailer, ball coupler, etc.), thereby providing faster the trailer angle estimates. Using a machine learning model to predict keypoint locations on or otherwise associated with a center axis of a trailer draw bar also has the benefit of recognizing and accounting for lens distortion. As the trailer angle increases and the draw bar moves toward the edge of the frame, the center axis of the draw bar may appear curved. However, the machine learning model may learn to recognize how the draw bar distorts over the range of possible trailer angles and predict accurate keypoint location(s) in image space, accounting for the distortion. Furthermore, by training a machine learning model using training data that represents different lighting conditions (e.g., datasets representing daytime, nighttime, driving under trees, etc.), the present techniques should be more robust than prior techniques and should reduce or even eliminate estimation failures resulting from changes in lighting conditions that occur in conventional techniques. In some embodiments in which inference is limited to image space and a particular camera's calibration is accounted for through post-inference projections, training need not consider the particular camera lens distortion or camera position (e.g., calibration) for each test setup, thereby simplifying the process of gathering training data using different towing vehicles. In addition, because the trailer, hitch, draw bar, and/or other components of the trailer may generally be positioned in a particular portion of an image (or other sensor data representation), only a portion of the image may be analyzed (e.g., a lower third of the image including the trailer and related components may be processed using a neural network, while the remaining portion of the image may be cropped or otherwise ignored). By reducing the number of pixels that are processed, the neural network may perform more quickly without any loss of precision or accuracy. Finally, since the present trailer angle estimation process may effectively infer the ray corresponding to the center axis of the draw bar in image space, burdensome conventional techniques such as those required in positioning fiducial markers in the trailer system for data collection are no longer needed.

As such, a robust trailer angle estimate may be generated and provided to an autonomous vehicle drive stack or other control algorithm to allow for safe and comfortable planning and control of the vehicle, robot, or other towing object. For example, one or more vehicle control algorithms may monitor and use real-time or near real-time trailer angle estimates to maintain a safe trailer angle during maneuvers (e.g., turning, changing lanes, parking, etc.) and/or ensure there is adequate clearance to safely navigate corners and obstacles. As such, the present trailer angle estimates can help vehicle control algorithms maintain stability, improve maneuverability, ensure clearance, and enhance safety while towing a trailer.

With reference to FIG. 1, FIG. 1 is an example trailer angle estimation pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 1000 of FIGS. 10A-10D, example computing device 1100 of FIG. 11, and/or example data center 1200 of FIG. 12.

Figure 2:
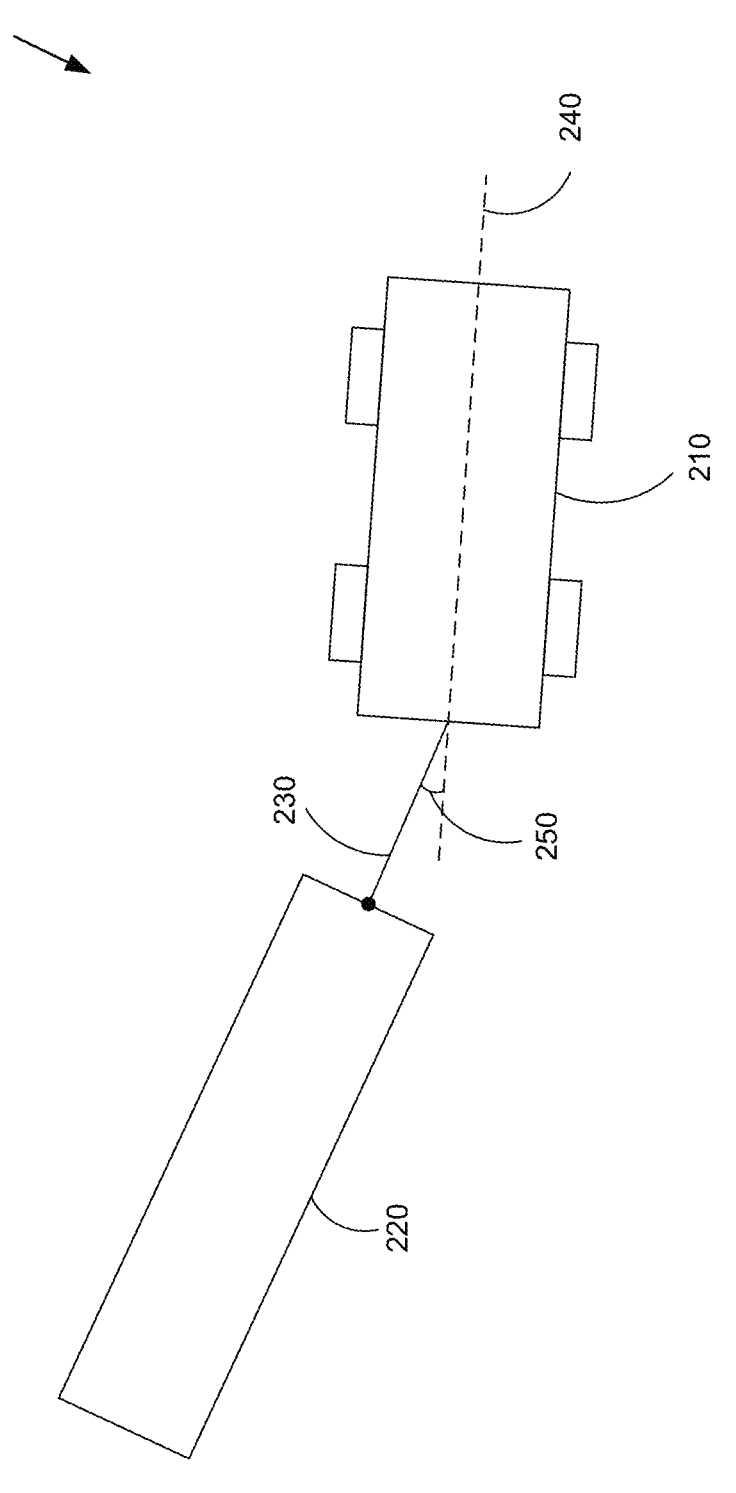
FIG. 2 is an illustration of an example trailer angle between the longitudinal axis of a towing vehicle and the longitudinal axis of a trailer, in accordance with some embodiments of the present disclosure.

At a high level, the trailer angle estimation pipeline 100 may estimate and generate a representation of an observed trailer angle based on sensor data 102 (e.g., image data, RADAR data, LiDAR data, etc.) representing the position of a trailer attached to and/or being towed by an ego-machine (e.g., the autonomous vehicle 1000 of FIGS. 10A-10D) through a 3D environment. FIG. 2 is an illustration of an example trailer angle 250 which the trailer angle estimation pipeline 100 may be used to estimate. More specifically, FIG. 2 illustrates a tow-down view of a vehicle 210 towing a trailer 220 attached via a drawbar 230, where the trailer angle 250 is formed between the longitudinal axis 240 of the vehicle 210 and the draw bar 230.

Returning to FIG. 1, the sensor data 102 may be captured by one or more sensor(s) 101 (e.g., a rear-facing camera) of the ego-machine as the ego-machine navigates through the 3D environment. The sensor data 102 may be applied to a trailer angle estimator 110, which may comprise one or more machine-learning model(s) 112 (e.g., one or more deep neural networks or "DNNs") that detect one or more key-points in the sensor data 102 (e.g., in two-dimensional (2D) image space), a back-projection component 114 that back-projects the detected keypoint(s) (and/or a fixed keypoint) into 3D space (e.g., onto the ground plane), and/or an angle computation component 116 that estimates the trailer angle based on the 3D locations of the projected keypoints. In some embodiments, the trailer angle estimation pipeline 100 may be run at a designated frame rate, and/or a prediction propagation component 118 may use optical flow (e.g., using a discrete hardware component, in embodiments, such as an optical flow accelerator (OFA)) or some other type of feature tracking to propagate predicted keypoint(s) from one frame to the next in lieu of running the machine learning model(s) 112 on a particular frame of the sensor data 102. As such, the estimated trailer angle may be provided to, and used by, control component(s) of the ego-machine (e.g., an autonomous driving software stack 122 and/or components of the autonomous vehicle autonomous vehicle 1000 of FIGS. 10A-10D such as controller(s) 1036, advanced driver assistance system (ADAS) system 1038, and/or System-on-Chip(s) (SoC(s)) 1004) to aid the ego-machine in performing one or more operations within the 3D environment, such as path planning, obstacle avoidance, assisting with parking maneuvers (e.g., presenting a recommended path on a display visible to an operator of the vehicle), self-parking, and/or others.

Generally, trailer angle estimation may be performed using sensor data 102 from any number and any type of sensor, such as, without limitation, one or more cameras, LiDAR sensors, RADAR sensors, ultrasonic sensors, and/or other sensor types such as those described below with respect to the autonomous or semi-autonomous vehicle 1000. For example, the sensor(s) 101 may include one or more sensor(s) 101 of an ego-machine-such as a rear-facing camera of the wide-view camera(s) 1070—and the sensor(s) 101 may be used to generate sensor data 102 that represents a trailer being towed through the 3D environment by the ego-machine. In an example embodiment, the ego-machine includes a rear-facing camera (e.g., fisheye camera), and the sensor(s) 101 correspond to the rear-facing camera. As such, the sensor(s) 101 (e.g., the rear-facing camera) may be used to generate the sensor data 102 (e.g., a video comprising a sequence of frames of image data) that represents an observed trailer being towed by the ego-machine.

In some embodiments, a representation of the sensor data 102 (e.g., one or more images from one or more cameras) may be applied to the machine learning model(s) 112. For example, the sensor data 102 may comprise individual frames of image data (e.g., images generated using the same camera), and each individual frame (e.g., image) may be sequentially applied to the machine learning model(s) 112. In some embodiments, the sensor data 102 may be accumulated (e.g., from multiple sensors, over time) and a combined representation (e.g., stacking multiple images into corresponding channels of a tensor) may be applied to the machine learning model(s) 112. Additionally or alternatively, in some embodiments, the sensor data 102 may be processed into some other format that the machine learning model(s) 112 accept. For example, in some embodiments in which the sensor data 102 includes a representation of measured 3D points (e.g., LiDAR or RADAR point clouds), the measured 3D points (and/or other data) may be accumulated (e.g., over a designated number of time slices, LiDAR or RADAR spins, etc.), transformed to a single coordinate system (e.g., centered around an origin of a rig coordinate system of the ego-machine), ego-motion-compensated (e.g., to a latest known position of the ego-machine), and/or projected to form a projection image representing any suitable view of the 3D environment (e.g., perspective, orthographic), having any number of channels (e.g., a single channel image, a multi-channel image or tensor) representing any characteristic of the sensor data 102 (e.g., projected position of a measured 3D point, one or more reflection characteristics, image data such as pixel color, etc.). In some embodiments, different sensor(s) 101 (whether the same type or a different of sensor) may be used to generate different modalities of sensor data 102 (e.g., camera images, LiDAR range images, etc.) having the same (e.g., perspective) view of the 3D environment in a common image space, and sensor data 102 from the different sensors 101 and/or sensor modalities may be stored in different channels of a multi-channel image or tensor and applied to the machine learning model(s) 112. These are meant simply as examples, and other variations are contemplated within the scope of the present disclosure.

At a high level, the machine learning model(s) 112 may predict the locations of one or more keypoints (e.g., two or more keypoints) associated with (e.g., on or substantially on) the center axis of a trailer draw bar represented in the sensor data 102 (e.g., one or more camera image(s) and/or other sensor data, optionally stacked into corresponding channels of an input tensor). For example, the machine learning model(s) 112 (e.g., one or more DNNs) may extract classification data (e.g., a heat map for each channel storing confidence data representing a likelihood that each pixel is part of a keypoint associated with that channel), regression data (e.g., a representation of regressed coordinates of each supported keypoint in 2D image space and/or 3D space), and/or other data.

In some embodiments, the machine learning model(s) 112 may be implemented using a DNN, such as a convolutional neural network (CNN). Although certain embodiments are described with the machine learning model(s) 112 being implemented using neural network(s), this is not intended to be limiting. For example, and without limitation, the machine learning model(s) 112 may include any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), Hopfield, Boltzmann, deep belief, de-convolutional, generative adversarial, liquid state machine, etc.), and/or other types of machine learning models.

In some embodiments, the machine learning model(s) 112 may include a common trunk (or stream of layers) with several input and/or output heads (or at least partially discrete streams of layers) for accepting different inputs and/or predicting different outputs. For example, the machine learning model(s) 112 may include, without limitation, a feature extractor (e.g., a DNN, an encoder/decoder, etc.) including convolutional layers, pooling layers, and/or other layer types, where the output of the feature extractor may be provided as input to a plurality of output heads (e.g., classification and/or regression heads) for detecting and/or regressing coordinates of corresponding keypoints. These architectures are meant simply as examples, and other architectures may be implemented within the scope of the present disclosure.

FIGS. 3A-3B illustrate example keypoint locations for different types of trailer draw bars, in accordance with some embodiments of the present disclosure. For example, FIG. 3A is an image 300 of a trailer 305 being towed via an I-frame draw bar 310. The image 300 may represent a portion of an image which may be generated using a rear-facing camera attached to a towing vehicle that is towing the trailer 305. Generally, the machine learning model(s) 112 of FIG. 1 may be used to predict any number of keypoints substantially on and/or along the I-frame draw bar 310 (e.g., 2, 5, 10, etc.). For example, in some embodiments, the machine learning model(s) 112 of FIG. 1 may be used to predict the location(s) of the junction 315 between the draw bar 310 and the towing vehicle, the point of attachment 320 where the drawbar 310 attaches to the trailer 305, and/or any number of points between the junction 315 and the point of attachment 320.

FIG. 3B is an image 350 of a trailer 355 being towed via a V-frame draw bar 360. The image 350 may represent a portion of an image which may be generated using a rear-facing camera attached to a towing vehicle that is towing the trailer 355. Generally, the machine learning model(s) 112 of FIG. 1 may be used to predict any number of keypoints substantially on and/or along the center axis of the V-frame draw bar 360 (e.g., 2, 5, 10, etc.). For example, in some embodiments, the machine learning model(s) 112 of FIG. 1 may be used to predict the location(s) of the junction 365 between the draw bar 360 and the towing vehicle, the point of attachment 370 where the draw bar 360 attaches to the trailer 355, and/or any number of points between the junction 365 and the point of attachment 370.

FIG. 4 is an illustration of example classification data representing a predicted likelihood that each pixel is part of a detected keypoint, in accordance with some embodiments of the present disclosure. More specifically, FIG. 4 is image 400 of a trailer 405 being towed via a V-frame draw bar 410 with classification data and locations of predicted keypoints 420 and 430 and ground truth keypoints 440 and 450 superimposed on top. The image 400 may represent a portion of an image which may be generated using a rear-facing camera attached to a towing vehicle that is towing the trailer 405. In some embodiments, the machine learning model(s) 112 of FIG. 1 may be used to process the image 400 to generate classification data (e.g., a heat map) representing a predicted likelihood that each pixel is part of a detected keypoint.

In FIG. 4, the pixels with predicted classification data above a designated threshold are visualized as clusters 415 superimposed on corresponding portions of the underlying image 400, where each of the clusters 415 visualizes classification data which may be predicted by a different channel of the machine learning model(s) 112. Predicted keypoints 420 and 430 may represent the pixels with the maximum predicted likelihood for a corresponding one of the clusters 415, and the ground truth keypoints 440 and 450 may represent corresponding labeled locations. In this example, the predicted keypoints 420 and 430 are located substantially on the center axis of the draw bar 410. Note that the predicted keypoints 420 and 430 need not necessarily coincide with their corresponding ground truth keypoints 440 and 450. For example, predicted keypoints may not coincide with corresponding ground truth keypoints in scenarios in which a particular draw bar design was not represented in the training dataset used to train the machine learning model(s) 112. However, since the predicted keypoints 420 and 430 are substantially on the center axis of the draw bar 410, the center axis formed by the predicted keypoints 420 and 430 may be used to estimate the trailer angle independent of the location(s) of the predicted keypoints 420 and 430 on the center axis. As such, by predicting keypoint locations substantially on the center axis of a trailer draw bar, trailer angle may be estimated independent of the draw bar design.

As such and returning to FIG. 1, the output of the machine learning model(s) 112 may represent the locations of detected keypoints in 2D image space, and the back-projection component 114 may process the output to identify the locations of the detected keypoints (e.g., coordinates in 2D image space) and back-project the locations into a 3D coordinate system, such as a 3D rig coordinate system associated with the ego-machine. More specifically, in some embodiments, the sensor data 102 (e.g., an image) and the output of the machine learning model(s) 112 may both be represented in the same 2D space such as a 2D image space corresponding to a camera used to generate the image. For example, the input and output of the machine learning model(s) 112 may (but need not) share the same pixel resolution, and the output of the machine learning model(s) 112 may include any number of output channels (e.g., one for each supported keypoint) representing detected locations of N corresponding keypoints (e.g., using N predicted heat maps, N sets of regressed keypoint coordinates, etc.).

Taking an example embodiment in which the machine learning model(s) 112 includes N output channels that each predict classification data (e.g., a heat hap) for a corresponding one of N supported keypoints (e.g., two output channels, one for each of two keypoints), the back-projection component 114 may apply a threshold confidence level to the classification data for each output channel and/or identify one or more pixels in each output channel having the highest predicted likelihood of depicting the keypoint represented by that channel. Additionally or alternatively, taking an example embodiment in which the machine learning model(s) 112 predicts an encoded representation of regressed coordinates (e.g., in 2D image space) for each supported keypoint, the back-projection component 114 may process the encoded representation to extract or otherwise identify the locations (e.g., 2D pixel coordinates) of each detected keypoint. As such, the back-projection component 114 may use calibration parameters of the sensor 101($s$) (e.g., a rear-facing camera) used to generate the sensor data 102 to back-project the detected keypoint locations from 2D image space to a corresponding 3D space (e.g., a 3D rig coordinate system associated with the ego-machine). As such, the back-projection component 114 may effectively convert 2D locations of detected keypoint locations to corresponding projected 3D locations.

More specifically, in an example embodiment, the machine learning model(s) 112 detects locations of two keypoints in a particular frame of sensor data 102 (e.g., a camera image)—a pixel $X_0$ representing the trailer draw bar junction (e.g., the point the draw bar pivots about) and an arbitrary pixel $X_1$ somewhere along the center axis of the draw bar. Accordingly, the back-projection component 114 may process the output of the machine learning model(s) 112 to identify the two 2D points in image space and back-project the 2D points onto a 3D representation of the ground (e.g., based on an assumption that the ground plane is flat near the ego-machine) to generate corresponding projected 3D locations $X_0'$ and $X_1'$. As such, the angle computation component 116 may calculate the trailer angle as the angle between the longitudinal axis (or some other forward-facing axis) of the ego-machine and a line, ray, or vector formed by or fitted to the 3D locations $X_0'$ and $X_1'$ of the projected keypoints (e.g., the vector $X_0'X_1'$), and the trailer angle estimator 110 may provide a representation of the trailer angle to the control component(s) of the ego-machine (e.g., the autonomous driving software stack 122).

In some embodiments, the trailer angle estimator 110 may operate at a designated frame rate, which may (but need not) correspond to the frame rate at which the sensor(s) 101 is operated. For example, a rear-facing camera may be used to generate images at a frame rate of 30 frames per second (fps), and the trailer angle estimator 110 may operate at the same (or some other) frame rate (e.g., 1 fps, 10 fps, 30 fps, etc.) to generate and provide the autonomous driving software stack 122 with corresponding trailer angle estimates (e.g., for each frame, every N frames, every N seconds, etc.). In some embodiments, the prediction propagation component 118 may use optical flow or some other type of feature tracking (e.g., KLT feature tracking, SIFT, SURF, ORB tracking, etc.) to propagate predicted keypoint(s) from one frame to the next (e.g., from the prediction propagation component 118 to the back-projection component 114) in lieu of running the machine learning model(s) 112 on a particular frame of the sensor data 102

As such, the trailer angle estimator 110 may generate an estimation of the trailer angle and may provide a representation of the estimated trailer angle at any rate to the autonomous driving software stack 122, other component(s) executing on the vehicle 1000 of FIGS. 10A-10D (e.g., the SoC(s) 1004, the CPU(s) 1018, the GPU(s) 1020, controller(s) 1036, ADAS 1038, etc.) or some other ego-machine to aid the ego-machine in performing one or more operations, such as path planning, obstacle avoidance, assisting with parking maneuvers (e.g., presenting a recommended path on a display visible to an operator of the vehicle), self-parking, and/or others.

In some embodiments, the trailer angle estimate(s) may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle, or collision avoidance layer of the drive stack 122), actuation component(s) 134 (e.g., corresponding to an actuation layer of the drive stack 122), and/or other components corresponding to additional and/or alternative layers of the drive stack 122.

The sensor manager may manage and/or abstract sensor data from the sensors of the vehicle 1000. For example, and with reference to FIG. 10C, the sensor data may be generated (e.g., perpetually, at intervals, based on certain conditions) by the LIDAR sensor(s) 1064, the RADAR sensor(s) 1060, the ultrasonic sensor(s) 1062, the stereo camera(s) 1068, other camera(s), and/or other sensors). The sensor manager may receive the sensor data from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1000 may use the uniform format, thereby simplifying processing of the sensor data. In some examples, the sensor manager may use a uniform format to apply control back to the sensors of the vehicle 1000, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122. The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1000 is allowed to drive or is capable of driving (e.g., based on the location of the drivable or other navigable paths defined by avoiding detected or known obstacles in the environment, accounting for known trailer dimensions and estimated trailer angle, etc.), how fast the vehicle 1000 can drive without colliding with an obstacle (e.g., an object, such as a structure, entity, vehicle, etc.) that is sensed by the sensors of the vehicle 1000, how fast the vehicle 1000 can turn while towing a trailer at an estimated trailer angle, etc.

The path perceiver may perform path perception, such as by perceiving nominal paths that are available in a particular situation. In some examples, the path perceiver may further take into account lane changes for path perception. A lane graph may represent the path or paths available to the vehicle 1000, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information. In some embodiments, the path perceiver may take into account the estimated trailer angle. For example, the path perceiver may identify and include paths that maintain a trailer angle that ensures stability and/or adequate clearance during acceleration, deceleration, turns, lane changes, reversing, and/or other maneuvers.

The wait perceiver may be responsible for determining constraints on the vehicle 1000 as a result of rules, conventions, and/or practical considerations. For example, the rules, conventions, and/or practical considerations may be in relation to a 3D road surface, traffic lights, multi-way stops, yields, merges, toll booths, gates, police or other emergency personnel, road workers, stopped buses or other vehicles, one-way bridge arbitrations, ferry entrances, trailer angle estimates, etc. Thus, the wait perceiver may be leveraged to identify potential obstacles and implement one or more controls (e.g., slowing down, coming to a stop, etc.) that may not have been possible relying solely on the obstacle perceiver. In some embodiments, the wait perceiver may take into account estimated trailer angle(s). For example, the wait perceiver may identify a turn (e.g., an approaching turn or active turning maneuver) and determine to apply and/or apply an acceleration or deceleration to ensure a safe trailer angle and/or adequate clearance during the turn.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1000 of static or stationary infrastructure objects and obstacles. The map perceiver may also generate information for the wait perceiver and/or the path perceiver, for example, such as to determine which light at an intersection has to be green for the vehicle 1000 to take a particular path.

Figure 10A:
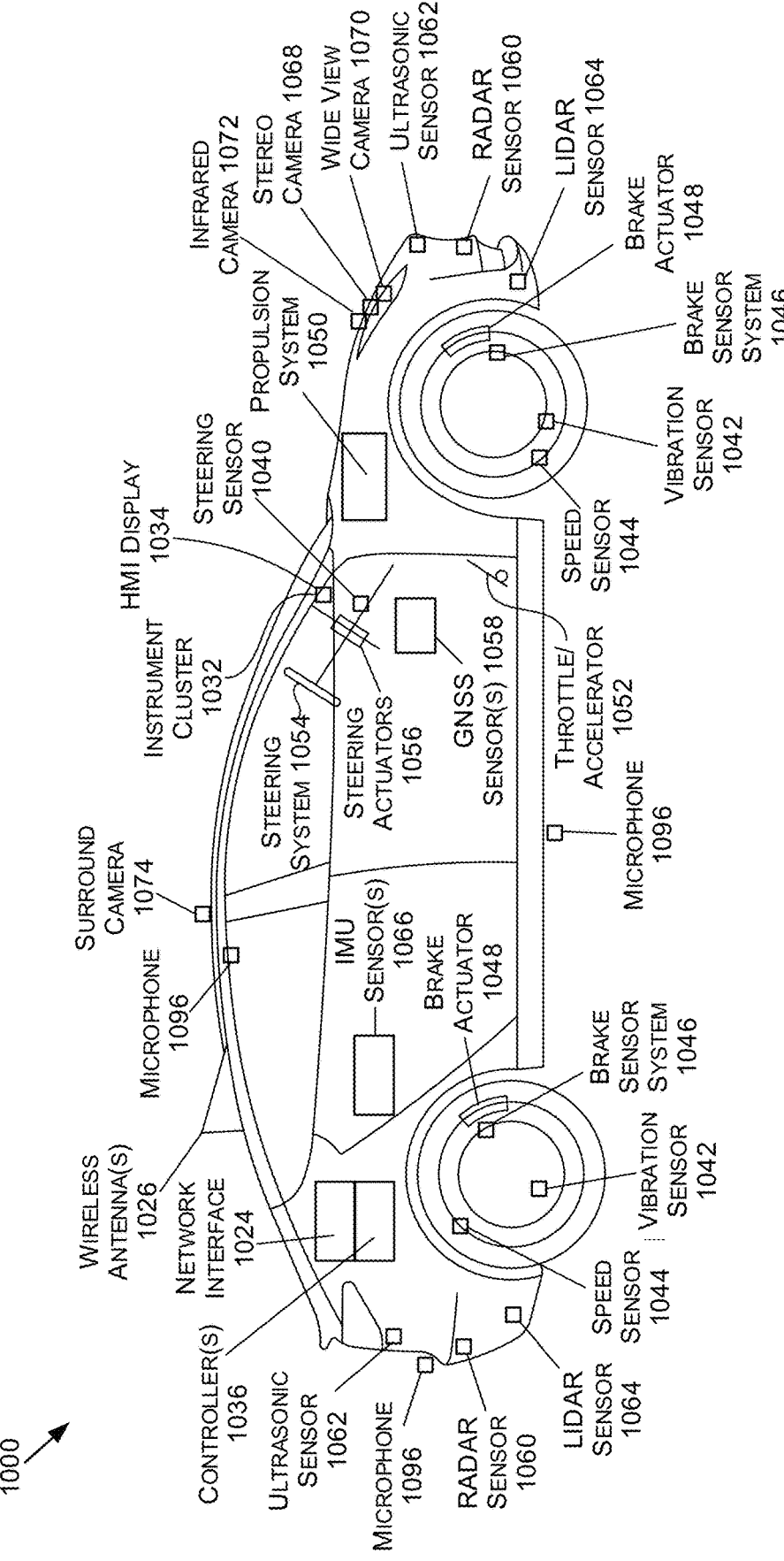
FIG. 10A is an illustration of an example autonomous vehicle, in accordance with some embodiments of the present disclosure.
Figure 10B:
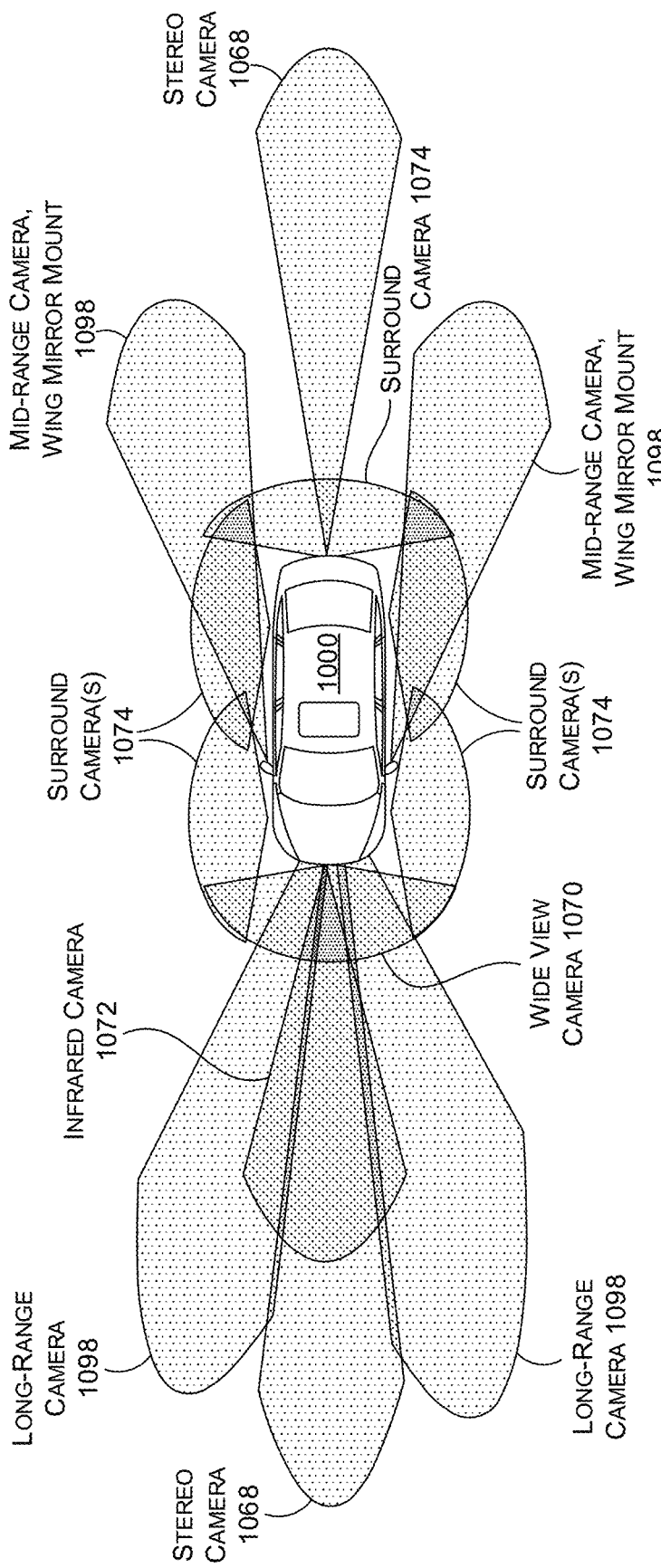
FIG. 10B is an example of camera locations and fields of view for the example autonomous vehicle of FIG. 10A, in accordance with some embodiments of the present disclosure.
Figure 10C:
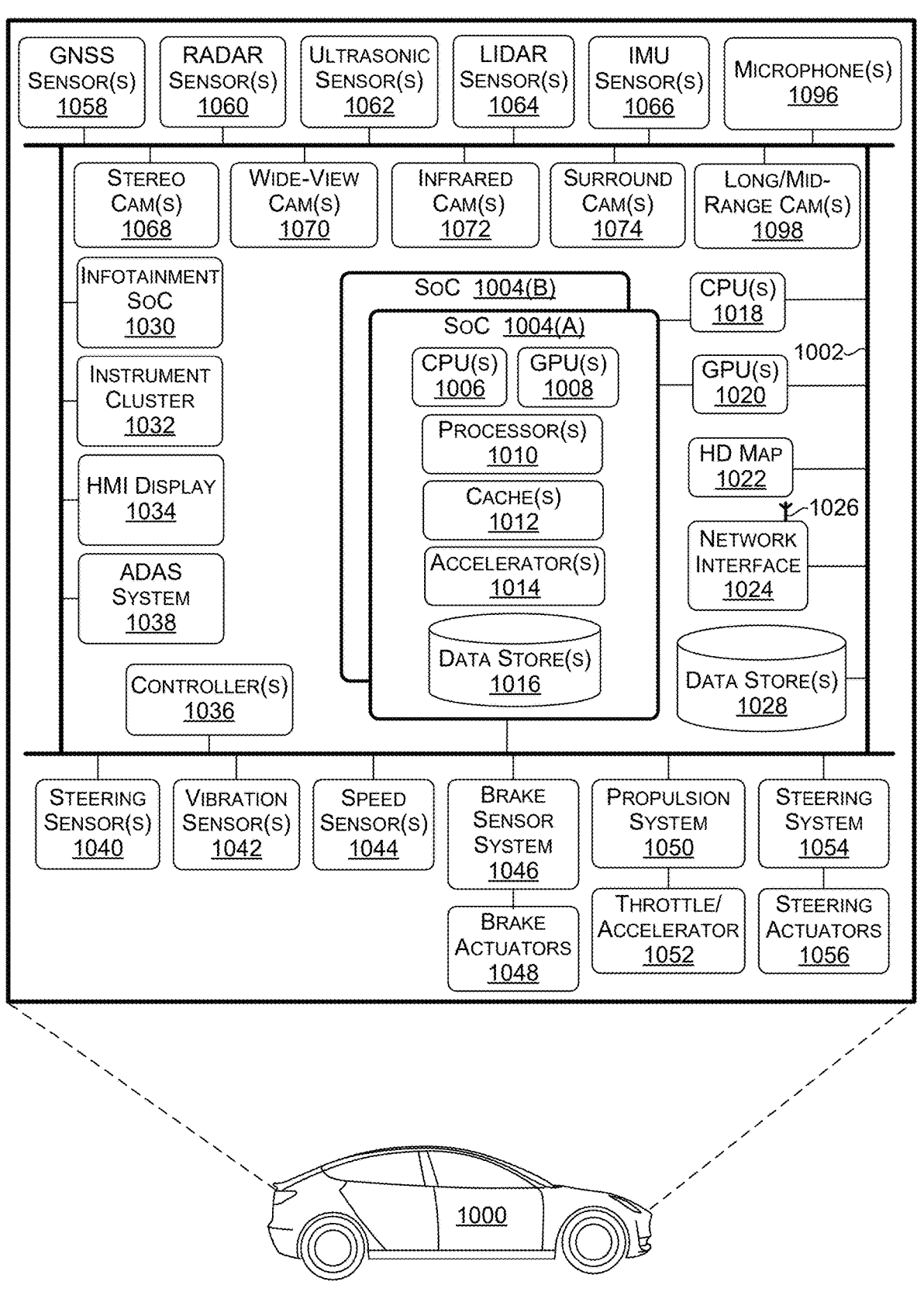
FIG. 10C is a block diagram of an example system architecture for the example autonomous vehicle of FIG. 10A, in accordance with some embodiments of the present disclosure.
Figure 10D:
FIG. 10D is a system diagram for communication between cloud-based server(s) and the example autonomous vehicle of FIG. 10A, in accordance with some embodiments of the present disclosure.

In some examples, information from the map perceiver may be sent, transmitted, and/or provided to server(s) (e.g., to a map manager of server(s) 1078 of FIG. 10D), and information from the server(s) may be sent, transmitted, and/or provided to the map perceiver and/or a localization manager of the vehicle 1000. The map manager may include a cloud mapping application that is remotely located from the vehicle 1000 and accessible by the vehicle 1000 over one or more network(s). For example, the map perceiver and/or the localization manager of the vehicle 1000 may communicate with the map manager and/or one or more other components or features of the server(s) to inform the map perceiver and/or the localization manager of past and present drives or trips of the vehicle 1000, as well as past and present drives or trips of other vehicles. The map manager may provide mapping outputs (e.g., map data) that may be localized by the localization manager based on a particular location of the vehicle 1000, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1000, etc. The waypoints may be representative of a specific distance into the future for the vehicle 1000, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1000, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector of the planning component(s) 128 as closely as possible and within the capabilities of the vehicle 1000. The control component(s) 130 may use tight feedback to handle unplanned events (e.g., an increasing trailer angle or a trailer angle exceeding a designated threshold) or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1000 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1000. In some examples, the obstacle avoidance component(s) 132 may be used independently of components, features, and/or functionality of the vehicle 1000 that is required to obey traffic rules and drive courteously. In such examples, the obstacle avoidance component(s) may ignore traffic laws, rules of the road, and courteous driving norms in order to ensure that collisions do not occur between the vehicle 1000 and any objects. As such, the obstacle avoidance layer may be a separate layer from the rules of the road layer, and the obstacle avoidance layer may ensure that the vehicle 1000 is only performing safe actions from an obstacle avoidance standpoint. The rules of the road layer, on the other hand, may ensure that vehicle obeys traffic laws and conventions, and observes lawful and conventional right of way (as described herein). In some examples, the drivable or other navigable paths may be used by the obstacle avoidance component(s) 132 in determining controls or actions to take. For example, the drivable paths may provide an indication to the obstacle avoidance component(s) 132 of where the vehicle 1000 may maneuver without jackknifing and without striking any objects, protuberances, structures, and/or the like, or at least where no static structures may exist.

Turning now to example techniques for training the machine learning model(s) 112, in some embodiments, training data may be generated by annotating frames of sensor data (e.g., images of one or more videos) representing a corresponding trailer being towed. For example, input training data may be generated using the same type of sensor as the sensor(s) 101 (e.g., a rear-facing fisheye camera) to collect sensor data (e.g., one or more videos) representing any number of towing setups (e.g., any number and type of towing machine, towing trailer, trailer draw bar design, etc.), trailer angles, lighting conditions (e.g., daytime, nighttime, driving under trees, etc.), sensor calibrations, and/or other characteristics. Ground truth training data may be obtained by back-projecting annotated keypoints symmetric about the center axis of a draw bar onto a 3D representation of the ground, using the projected annotated keypoints to estimate the projected center axis of the draw bar, re-projecting one or more points on the estimated projected center axis back into image space, and/or propagating ground truth keypoints from frame to frame to minimize labeling demands.

Figure 5:
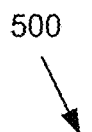
FIG. 5 is a block diagram of an example training data generation system, in accordance with some embodiments of the present disclosure.

FIG. 5 is a block diagram of an example training data generation system 500, in accordance with some embodiments of the present disclosure. In this example, the training data generation system 500 includes an annotation interface component 510, a back-projection component 520, a center axis estimation component 530, a projection component 540, a ground truth generation component 550, and a keypoint propagation component 560.

At a high level, the annotation interface component 510 may prompt a human labeler (e.g., operating a client device, not depicted, in communication with the annotation interface component 510) and receive input representing, or otherwise obtain, a label for one or more keypoints represented in a particular frame of sensor data (e.g., an image). Generally, sensor data (e.g., an image) may be annotated (e.g., manually, automatically, etc.) with labels or other markers identifying the locations, geometry, orientations, and/or classes of instances of relevant keypoints represented in the sensor data. The labels may be generated within a drawing program (e.g., an annotation program), computer aided design (CAD) program, labeling program, another type of suitable program, and/or may be hand drawn, in some examples. In any example, the labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). Generally, the labels may comprise points, bounding boxes, closed polylines, and/or other bounding shapes drawn, annotated, superimposed, and/or otherwise associated with the sensor data.

In some embodiments and/or for some draw bar designs (e.g., where one or more desired keypoints along the center axis of the draw bar land on edges of the draw bar, junctions between the draw bar and the towing machine or trailer, and/or other visually intuitive locations), ground truth keypoint locations may be directly annotated. For example, an I-frame draw bar typically has a fixed connection to the towing machine (e.g., at the draw bar junction), so the annotation interface component 510 may prompt for and/or receive a representation of a labeled location of that point (e.g., a bounding box enclosing the draw bar junction), and the annotation interface component 510 and/or the keypoint propagation component 560 may hold that label at a constant location for multiple frames (e.g., the entire video). In another example, the annotation interface component 510 may prompt for and/or receive a representation of a labeled location of (e.g., a bounding box enclosing) the opposite end of the I-frame draw bar where the draw bar attaches to the trailer. For example, FIG. 3A illustrates a label (e.g., bounding box 325) which may be drawn around the point of attachment 320 where the draw bar 310 attaches to the trailer 305, and a label (e.g., bounding box 330) which may be propagated (e.g., held constant) from a previous frame and may represent the location of the junction 315 between the draw bar 310 and the towing vehicle.

Figure 6A:
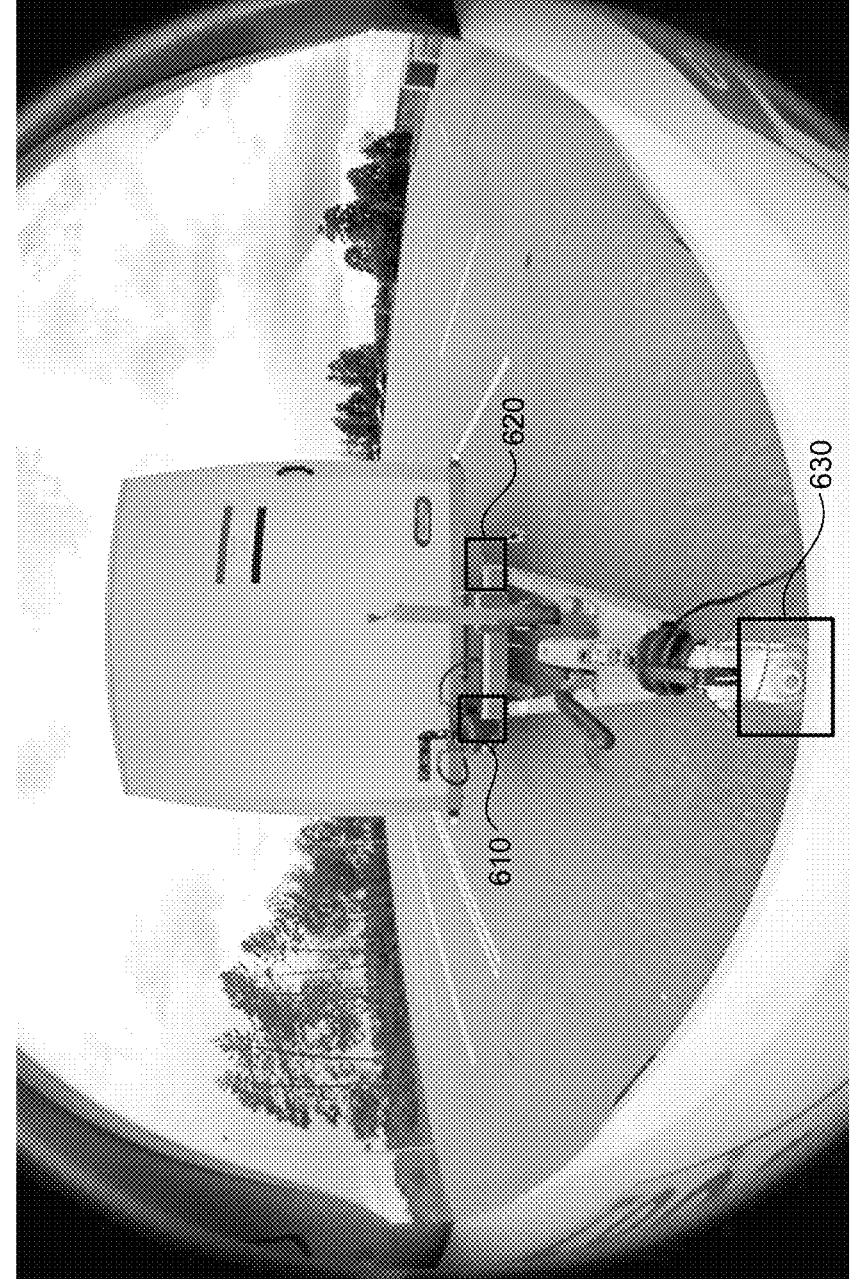
FIGS. 6A-6B illustrate example keypoints for different types of trailer draw bars, in accordance with some embodiments of the present disclosure.
Figure 6B:
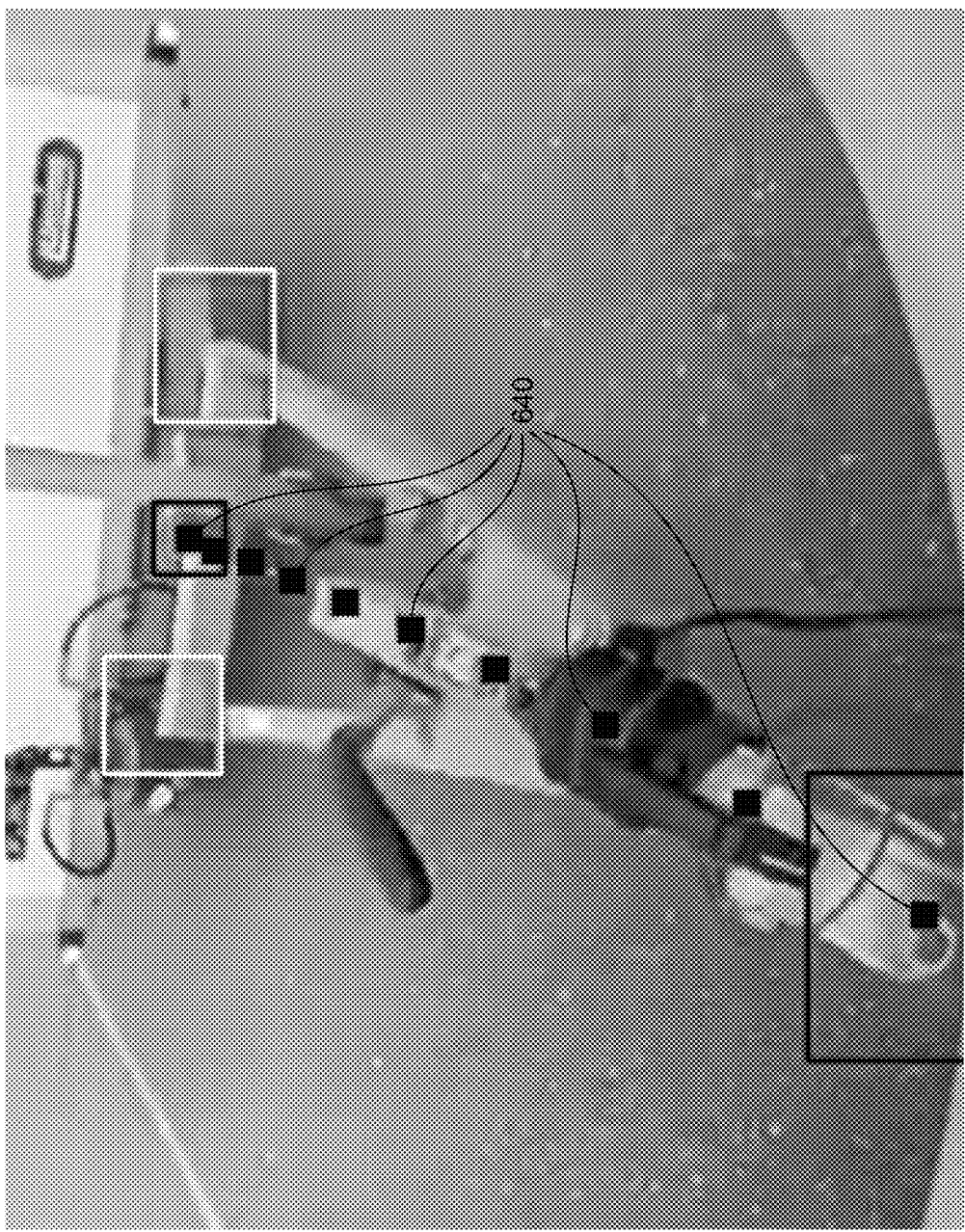

Returning to FIG. 5, in some embodiments and/or for some draw bar designs (e.g., where one or more desired keypoints along the center axis of the draw bar do not land on the draw bar itself), the annotation interface component 510 may prompt for and/or receive a representation of labeled locations of (e.g., a bounding box enclosing each keypoint of) one or more pairs of keypoints that are symmetrical about the center axis (e.g., the two tips of the wide end of a V-frame or Y-frame draw bar). FIG. 6A illustrates a label (e.g., bounding box 630) which may be drawn around the junction between a Y-frame draw bar and a towing machine (and/or propagated from a previous frame), and two labels (e.g., bounding boxes 610 and 610) which may be drawn around locations symmetrical about the center axis of the Y-frame draw bar where the draw bar attaches to the trailer. Returning to FIG. 5, the back-projection component 520 (which may include functionality corresponding to the back-projection component 114 of FIG. 1) may back-project the labeled keypoint locations (e.g., representative coordinates of each labeled point, a center and/or corner point of a labeled bounding box or other annotated shape) into 3D space (e.g., a 3D rig coordinate system of the towing machine), and the center axis estimation component 530 may use the resulting projected 3D keypoint locations to calculate the location of (e.g., a line, ray, or vector fitted to) a corresponding projection of the center axis of the draw bar. As such, the projection component 540 may sample one or more 3D points along the 3D estimate of the projected center axis of the draw bar, project the sampled 3D point(s) back into 2D space (e.g., back into the image being labeled), and identify or designate the projected point(s) as corresponding labeled keypoint location(s). For example, FIG. 6B illustrates example projected points 640 which may result from projecting equally spaced 3D points sampled along a 3D estimate of a projected center axis of the draw bar into image space.

Figure 7:
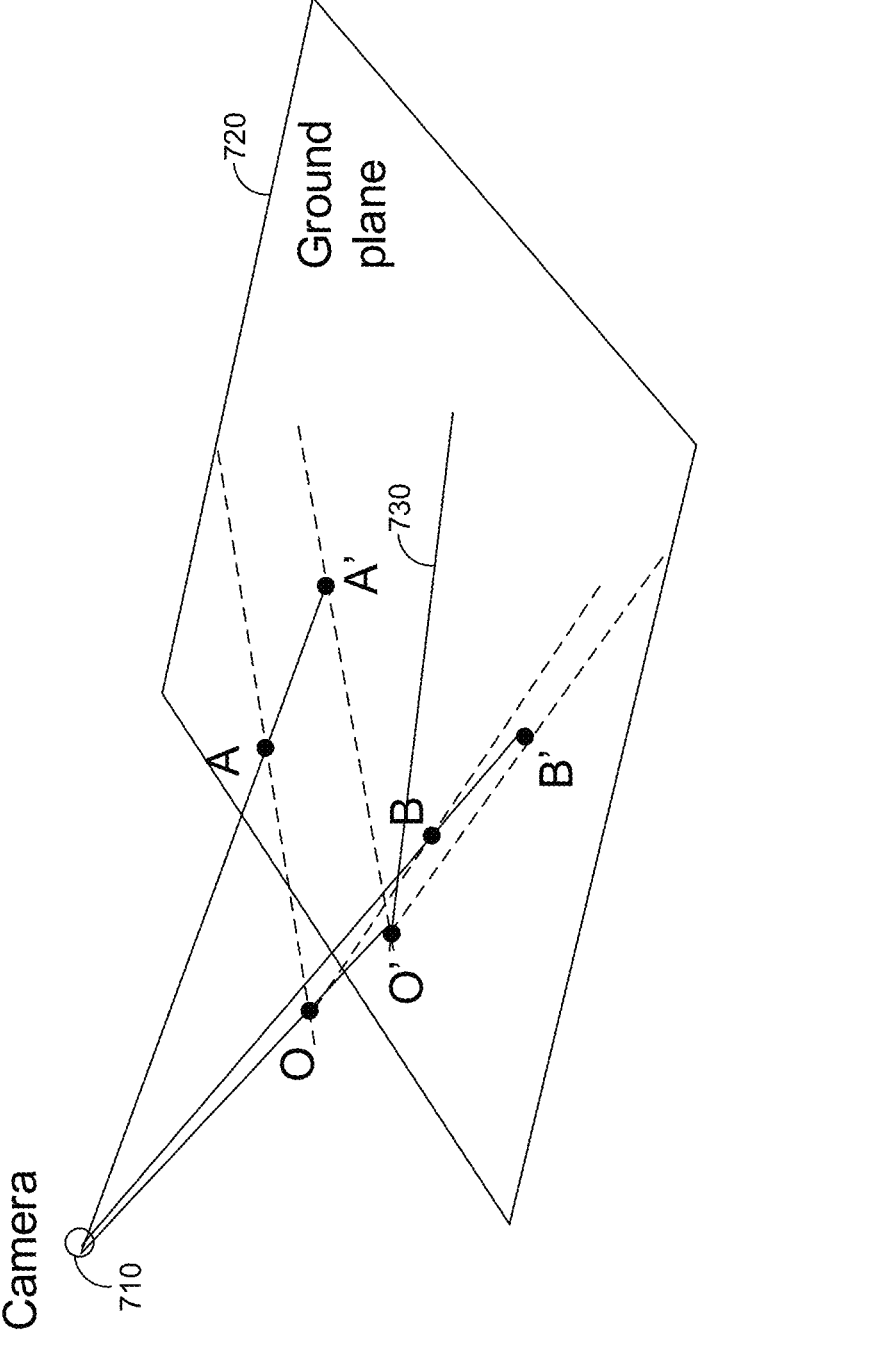
FIG. 7 is an illustration of a projected center axis of a trailer draw bar, in accordance with some embodiments of the present disclosure.

Referring now to FIG. 7, FIG. 7 is an illustration of a projected center axis 730 of a trailer draw bar, in accordance with some embodiments of the present disclosure. For example, assume a camera 710 is used to generate an image of a trailer draw bar, and the image is labeled with locations of the junction between the trailer draw bar and the towing vehicle and two points that are symmetric about the center axis of the draw bar. Those labeled 2D locations may correspond to the 3D locations of point O (the draw bar junction) and points A and B (the two points that are symmetric about the center axis of the draw bar) illustrated in FIG. 7. In this example, the back-projection component 520 of FIG. 5 may back-project the points A, B, and O from image space onto a 3D representation of the ground (e.g., the ground plane 720) to generate the 3D projected points A', B', and O' illustrated in FIG. 7.

As such, the center axis estimation component 530 may use the 3D projected points A', B', and O' to estimate the 3D location of a projected center axis 730 of the draw bar. For example, in some embodiments, the center axis estimation component 530 may identify the angle halfway between the angle <A'O'B', project a ray or line along that identified angle, and designate that projected ray or line as a 3D estimate of the projected center axis of the draw bar. In some embodiments, the center axis estimation component 530 may identify or otherwise represent an isosceles triangle formed by O' and the two direction vectors O'A' and O'B', identify the midpoint of that isosceles triangle, project a ray from O' to that midpoint (or fit a line to O' and M'), and designate that ray or line as a 3D estimate of the projected center axis of the draw bar. For example, the center axis estimation component 530 may replace O'A' with $O'+(A'-O')/|A'-O'|*L$ and O'B' with $O'+ (B'-O')/|B'-O'|$, where L may be arbitrarily chosen (e.g., $L=0.5*(|A'-O'|+|B'-O'|)$). As such, the center axis estimation component 530 may effectively compute the length of O'A' and the length of O'B', scale one or both to have the same length (e.g., scale O'A' to O'B', scale O'B' to O'A', scale both to some other length such as a length that is between the lengths of O'A' and O'B'), and compute the midpoint of the line between the adjusted endpoint(s) of the scaled O'A' and/or O'B'). In some embodiments, the center axis estimation component 530 may identify the midpoint of A'B', and project a ray from O' to that midpoint (or fit a line between O' and midpoint), and designate that ray or line as a 3D estimate of the projected center axis of the draw bar. As such, the projection component 540 may sample or otherwise identify one or more 3D points along the 3D estimate of the projected center axis 730 (e.g., one or more endpoints of the projected center axis, the midpoint M' of the isosceles triangle formed by O' and the two direction vectors O'A' and O'B', equally spaced 3D points, etc.), and project the 3D point(s) into image space to designate corresponding labeled keypoint location(s).

As such, the ground truth generation component 550 may use the labeled keypoint locations to generate corresponding ground truth data corresponding to the design of the machine learning model to be trained. For example, for a neural network where each channel predicts classification data (e.g., a heat map) representing likelihood that each pixel depicts a corresponding keypoint, the ground truth generation component 550 may generate a ground truth heat map based on the corresponding labeled keypoint location (e.g., using one value such as one to indicate pixels on a labeled location or inside a labeled region and another value such as zero to indicate pixels outside a labeled location, by positioning and/or centering a 2D distribution such as a Gaussian distribution on a corresponding labeled location, etc.). For a neural network that regresses keypoint coordinates (e.g., two channels regressing corresponding (x,y) coordinates for each keypoint), the ground truth generation component 550 may assign representative ground truth coordinates of each labeled keypoint (e.g., a labeled point, a center and/or corner point of a labeled bounding box or other annotated shape) to a corresponding channel for each coordinate and each keypoint. As such, the ground truth generation component 550 may associated the generated ground truth data with a corresponding training input (e.g., image).

In some embodiments, the keypoint propagation component 560 (e.g., which may include functionality corresponding to the prediction propagation component 118 of FIG. 1) may propagate one or more labeled keypoints from frame to frame using optical flow or some other type of feature tracking (e.g., KLT feature tracking, SIFT, SURF, ORB tracking, etc.) to reduce the amount of (e.g., manual) annotations needed. For example, given a labeled frame, the keypoint propagation component 560 may use optical flow to propagate labels from frame to frame, for example, until optical propagation fails (which should be rare, such as on the order of several times over thousands of frames). In some embodiments, when optical propagation fails, the annotation interface component 510 may prompt for and/or obtain the missing label(s) for that frame, and the process may be repeated. As such, the training data generation system 500 may generate ground truth keypoints rapidly (e.g., labels for 16,000 frames may be generated in less than a minute), dramatically reducing the need for manual annotations.

Accordingly, the training data generation system 500 may use sensor data and/or annotations to generate ground truth class confidence data and/or regression data, and may include this ground truth data with corresponding input training data (e.g., input images) as part of a training dataset to train the machine learning model(s) 112. Generally any suitable loss function may be used to update the machine learning model(s) 112 during training. For example, one or more loss functions may be used to compare the accuracy of the output(s) of the machine learning model(s) 112 to ground truth, and the parameters of the machine learning model(s) 112 may be updated (e.g., using backward passes, back-propagation, forward passes, etc.) until the accuracy reaches an optimal or acceptable level.

Now referring to FIGS. 8 and 9, each block of methods 800 and 900, described herein, comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the method 800 is described, by way of example, with respect to the trailer angle estimation pipeline 100 of FIG. 1, and the method 900 is described, by way of example, with respect to the training data generation system 500 of FIG. 5. However, these methods may additionally or alternatively be executed by any one system, or any combination of systems, including, but not limited to, those described herein.

FIG. 8 is a flow diagram showing a method 800 for estimating a trailer angle, in accordance with some embodiments of the present disclosure. The method 800, at block B802, includes generating, based at least on applying to one or more machine learning models a representation of sensor data representing a view of a draw bar connecting a trailer to an ego-machine, a representation of two or more points associated with a center axis of the draw bar. For example, with respect to FIG. 1, a representation of the sensor data 102 (e.g., an image generated using a rear-facing camera of a vehicle) may be applied to the machine learning model(s) 112 to predict the locations of one or more keypoints (e.g., two or more keypoints) associated with (e.g., on or substantially on) the center axis of a trailer draw bar represented in the sensor data 102. For example, the machine learning model(s) 112 (e.g., one or more DNNs) may extract classification data (e.g., a heat map for each channel storing confidence data representing a likelihood that each pixel is part of a keypoint associated with that channel), regression data (e.g., a representation of regressed coordinates of each supported keypoint in 2D image space and/or 3D space), and/or other data.

The method 800, at block B804, includes generating, based at least on the two or more points, an estimated trailer angle between a first axis of the ego-machine and a second axis of the trailer. For example, with respect to FIG. 1, the back-projection component 114 may process the output of the machine learning model(s) 112 to identify the locations of the detected keypoints (e.g., coordinates in 2D image space) and back-project the locations into corresponding 3D locations (e.g., on the ground plane) in a 3D coordinate system, such as a 3D rig coordinate system associated with the ego-machine. As such, the angle computation component 116 may estimate the trailer angle as the angle between the longitudinal axis (or some other forward-facing axis) of the ego-machine in the 3D coordinate system and a line, ray, or vector formed by or fitted to the 3D locations of the projected keypoints in the 3D coordinate system.

The method 800, at block B806, includes controlling one or more operations of the ego-machine based at least on the estimated trailer angle. For example, with respect to FIG. 1, the trailer angle estimator 110 may provide a representation of the trailer angle to the control component(s) of the ego-machine (e.g., the autonomous driving software stack 122) to aid the ego-machine in performing one or more operations, such as path planning, obstacle avoidance, assisting with parking maneuvers (e.g., presenting a recommended path on a display visible to an operator of the vehicle), self-parking, and/or others.

FIG. 9 is a flow diagram showing a method 900 for generating ground truth training data based on one or more pairs of keypoints that are symmetrical about a center axis of a trailer draw bar, in accordance with some embodiments of the present disclosure. The method 900, at block B902, includes receiving a representation of labeled 2D keypoint locations in image data of one or more pairs of keypoints that are symmetrical about a center axis of a draw bar connecting a trailer to an ego-machine. For example, with respect to FIG. 5, the annotation interface component 510 may prompt a human labeler and receive input representing, or otherwise obtain, a label for one or more keypoints represented in a particular frame of sensor data (e.g., an image). In some embodiments and/or for some draw bar designs (e.g., where one or more desired keypoints along the center axis of the draw bar do not land on the draw bar itself), the annotation interface component 510 may prompt for and/or receive a representation of labeled locations of (e.g., a bounding box enclosing each keypoint of) one or more pairs of keypoints that are symmetrical about the center axis (e.g., the two tips of the wide end of a V-frame or Y-frame draw bar).

The method 900, at block B904, includes generating a representation of a 3D estimate of a projection of the center axis of the draw bar based at least on the labeled 2D locations. For example, with respect to FIG. 5, the back-projection component 520 may back-project the labeled keypoint locations (e.g., representative coordinates of each labeled point, a center and/or corner point of a labeled bounding box or other annotated shape) into 3D space (e.g., a 3D rig coordinate system of the towing machine), and the center axis estimation component 530 may use the resulting projected 3D keypoint locations to calculate the location of (e.g., a line, ray, or vector fitted to) a corresponding projection of the center axis of the draw bar.

The method 900, at block B906, includes projecting one or more 3D points associated with the 3D estimate of the projection of the center axis of the draw bar to one or more corresponding 2D points in the image space. For example, with respect to FIG. 5, the projection component 540 may sample or otherwise identify one or more 3D points along the 3D estimate of the projected center axis 730 (e.g., one or more endpoints of the projected center axis, equally spaced 3D points, etc.), and project the 3D point(s) into image space to designate corresponding labeled keypoint location(s).

The method 900, at block B908, includes generating ground truth training data based at least on the one or more corresponding 2D points. For example, with respect to FIG. 5, the ground truth generation component 550 may use the labeled keypoint locations to generate corresponding ground truth data corresponding to the design of the machine learning model to be trained. For example, for a neural network where each channel predicts classification data (e.g., a heat map) representing likelihood that each pixel depicts a corresponding keypoint, the ground truth generation component 550 may generate a ground truth heat map based on the corresponding labeled keypoint location (e.g., using one value such as one to indicate pixels on a labeled location or inside a labeled region and another value such as zero to indicate pixels outside a labeled location, by positioning and/or centering a 2D distribution such as a Gaussian distribution on a corresponding labeled location, etc.). For a neural network that regresses keypoint coordinates (e.g., two channels regressing corresponding (x,y) coordinates for each keypoint), the ground truth generation component 550 may assign representative ground truth coordinates of each labeled keypoint (e.g., a labeled point, a center and/or corner point of a labeled bounding box or other annotated shape) to a corresponding channel for each coordinate and each keypoint.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), one or more occupant monitoring system (OMS) sensor(s) 1001 (e.g., one or more interior cameras), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as BLUETOOTH®, BLUETOOTH Low Energe ("LE"), Z-WAVER. ZIGBEE®, etc., and/or low power wide-area network(s) ("LPWANs"), such as LORAWAN®, SIGFOX®, etc.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a FOVEON X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Cameras with a field of view that include portions of the interior environment within the cabin of the vehicle 1000 (e.g., one or more OMS sensor(s) 1001) may be used as part of an occupant monitoring system (OMS) such as, but not limited to, a driver monitoring system (DMS). For example, OMS sensors (e.g., the OMS sensor(s) 1001) may be used (e.g., by the controller(s) 1036) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power: each core clock may be gated when the core is not actively executing instructions due to execution of WFI/WFE instructions: each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))— or other math coprocessor or numeric coprocessor types— for performing mathematical operations within the system. For example, the SoC(s) 1004 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors: a CNN for distance estimation using data from camera sensors: a CNN for emergency vehicle detection and identification and detection using data from microphones: a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1016 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a BLUETOOTH antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, BLUETOOTH, BLUETOOTH LE, Wi-Fi, Z-WAVE, ZIGBEE, LORAWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may include radios, disk players, navigation systems, video players, USB and BLUETOOTH connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(D) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
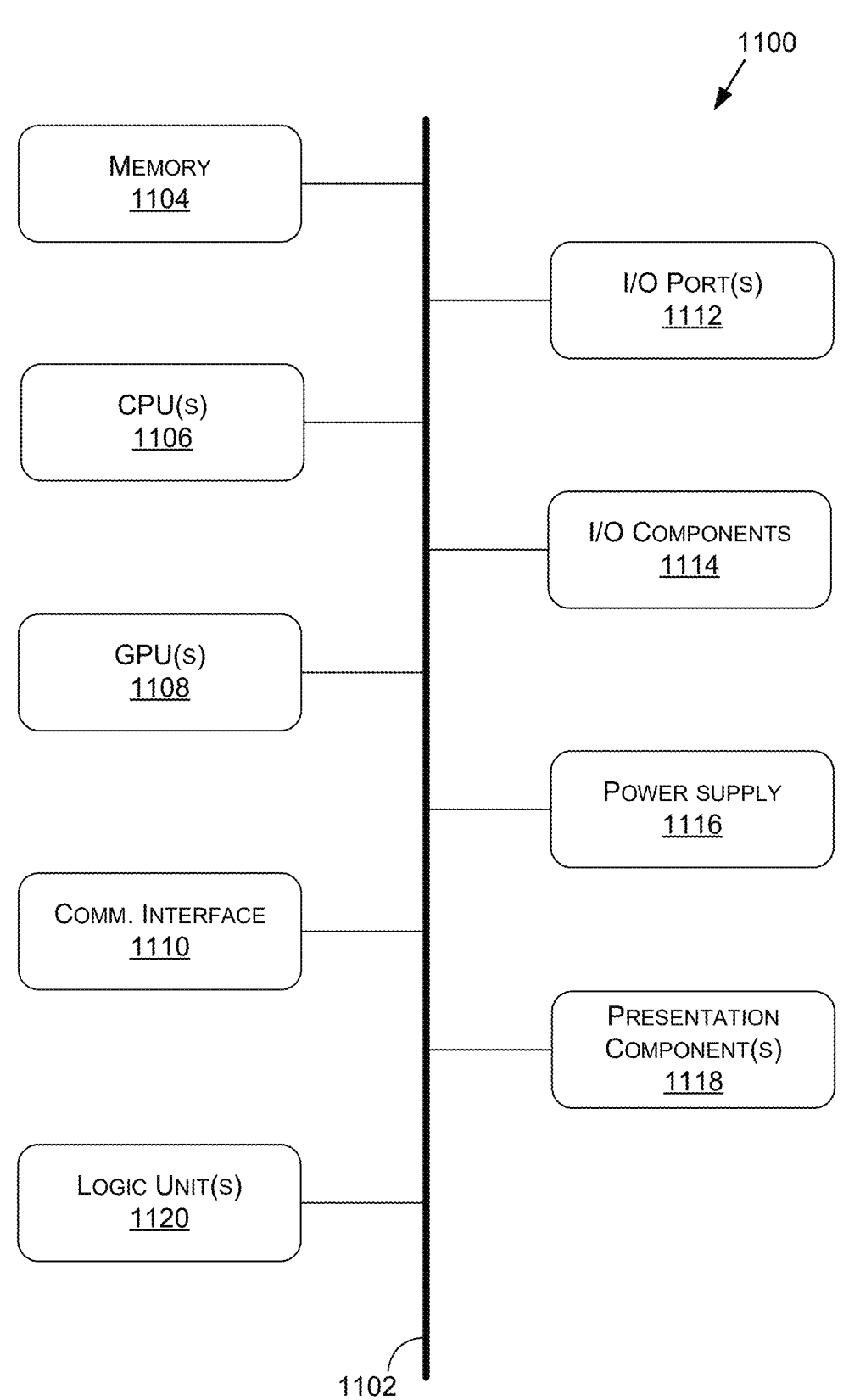
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodi-ments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-WAVE, BLUETOOTH, BLUETOOTH LE, ZIGBEE, etc.), wired networks (e.g., communicating over Ethernet or InfiniBand), low-power wide-area networks (e.g., LORAWAN, SIGFOX, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUS), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161 (N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by AMAZON WEB SERVICES<GOOGLE CLOUD AND MICROSOFT AZURE. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PYTORCH, TENSORFLOW, CAFFE, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more processing units to:
  generate, based at least on one or more machine learning models processing a representation of sensor data corresponding to a view of a drawbar connecting a trailer to an ego-machine, a representation of three or more points substantially along a center axis of the drawbar;
  generate, based at least on an estimated ground projection of the center axis of the drawbar corresponding to the three or more points, an estimated trailer angle between a first axis of the ego-machine and a second axis of the trailer; and
  control one or more operations of the ego-machine based at least on the estimated trailer angle.

2. The processor of claim 1, wherein the one or more processing units are further to generate the estimated trailer angle based at least on back-projecting the three or more points into a three-dimensional (3D) coordinate system to identify 3D locations corresponding to the estimated ground projection of the center axis of the drawbar and calculating the estimated trailer angle as an angle between a longitudinal axis of the ego-machine and the estimated ground projection of the center axis of the drawbar.

3. The processor of claim 1, wherein the three or more points substantially along the center axis of the drawbar comprise a first keypoint representing a junction around which the drawbar pivots and one or more other keypoints.

4. The processor of claim 1, wherein the three or more points substantially along the center axis of the drawbar comprise a first fixed keypoint representing a junction around which the drawbar pivots and one or more predicted keypoints.

5. The processor of claim 1, wherein the one or more processing units are further to generate the estimated trailer angle based at least on a three-dimensional (3D) representation of the estimated ground projection of the center axis of the drawbar corresponding to a line or ray fitted to a ground projection of the three or more points.

6. The processor of claim 1, wherein the sensor data represents a two-dimensional (2D) view of the drawbar, and the three or more points along the center axis of the drawbar comprise two or more 2D points detected in the 2D view by the one or more machine learning models.

7. The processor of claim 1, wherein the one or more machine learning models comprise a neural network with an output channel for each individual point of the three or more points substantially along the center axis of the drawbar, and the output channel for each point is configured to predict classification data representing a likelihood that each individual pixel, of one or more pixels of the representation of the sensor data, depicts the individual point associated with the center axis of the drawbar.

8. The processor of claim 1, wherein the sensor data comprises image data generated using a rear-facing camera of the ego-machine.

9. The processor of claim 1, wherein the one or more processing units are further to repetitively generate the estimated trailer angle at a designated frame rate based at least on updated detections of the three or more points substantially along the center axis of the drawbar represented in corresponding frames of the sensor data.

10. The processor of claim 1, wherein the one or more processing units are further to propagate at least one detected point of the three or more points substantially along the center axis of the drawbar to a corresponding location in a subsequent frame using optical flow.

11. The processor of claim 1, wherein the operations of the ego-machine that are based at least on the estimated trailer angle comprise one or more of path planning, obstacle avoidance, presenting a recommended path on a display visible to an operator of the ego-machine, or self-parking.

12. The processor of claim 1, wherein the processor is comprised in at least one of:
  a control system for an autonomous or semi-autonomous machine;
  a perception system for the autonomous or semi-autonomous machine;
  a system for performing simulation operations;
  a system for performing digital twin operations;
  a system for performing light transport simulation;
  a system for performing collaborative content creation for 3D assets;
  a system for performing deep learning operations;
  a system for performing remote operations;
  a system for performing real-time streaming;
  a system for generating or presenting one or more of augmented reality content, virtual reality content, or mixed reality content;
  a system implemented using an edge device;
  a system implemented using a robot;
  a system for performing conversational AI operations;
  a system implementing one or more language models;
  a system implementing one or more large language models (LLMs);
  a system for generating synthetic data;
  a system for generating synthetic data using AI;
  a system incorporating one or more virtual machines (VMs);
  a system implemented at least partially in a data center; or
  a system implemented at least partially using cloud computing resources.

13. A system comprising one or more processing units to control one or more operations of an ego-machine using a trailer kink angle estimated based at least on an estimated ground projection of a center axis of a drawbar connecting a trailer to the ego-machine, the estimated ground projection generated using three or more points detected substantially along the center axis of the drawbar using one or more machine learning models.

14. The system of claim 13, wherein the one or more processing units are further to estimate the trailer kink angle based at least on back-projecting the three or more points into a three-dimensional (3D) coordinate system to identify 3D locations corresponding to the estimated ground projection of the center axis of the drawbar and calculating the estimated trailer kink angle as an angle between a longitudinal axis of the ego-machine and the estimated ground projection of the center axis of the drawbar.

15. The system of claim 13, wherein the three or more points substantially along the center axis of the drawbar comprise a first keypoint representing a junction around which the drawbar pivots and one or more other keypoints.

16. The system of claim 13, wherein the using the one or more machine learning models to detect the three or more points comprises applying sensor data representing a two-dimensional (2D) view of the drawbar to the one or more machine learning models to detect the three or more points in the 2D view.

17. The system of claim 13, wherein the operations of the ego-machine controlled using the trailer kink angle comprise one or more of path planning, obstacle avoidance, presenting a recommended path on a display visible to an operator of the ego-machine, or self-parking.

18. The system of claim 13, wherein the system is comprised in at least one of:

a control system for an autonomous or semi-autonomous machine;

a perception system for the autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

19. A method comprising:

generating, using one or more machine learning models and based at least on a two-dimensional (2D) view of a drawbar connecting a trailer to an ego-machine, a representation of three or more 2D points in the 2D view along the drawbar;

generating, based at least on an estimated ground projection of a center axis of the drawbar corresponding to the three or more 2D points, an estimated trailer angle between a first axis of the ego-machine and a second axis of the trailer; and controlling one or more operations of the ego-machine based at least on the estimated trailer angle.

20. The method of claim 19, wherein the method is performed by at least one of:

a control system for an autonomous or semi-autonomous machine;

a perception system for the autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

* * * * *